US011919800B2

United States Patent
De Angelis et al.

(10) Patent No.: US 11,919,800 B2
(45) Date of Patent: Mar. 5, 2024

(54) MODULAR MOLTEN GLASS DELIVERY APPARATUS

(71) Applicant: CORNING INCORPORATED, Corning, NY (US)

(72) Inventors: Gilbert De Angelis, Lindley, NY (US); Juan Camilo Isaza, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 346 days.

(21) Appl. No.: 17/279,052

(22) PCT Filed: Sep. 24, 2019

(86) PCT No.: PCT/US2019/052601
§ 371 (c)(1),
(2) Date: Mar. 23, 2021

(87) PCT Pub. No.: WO2020/068750
PCT Pub. Date: Apr. 2, 2020

(65) Prior Publication Data
US 2022/0073398 A1 Mar. 10, 2022

Related U.S. Application Data

(60) Provisional application No. 62/896,702, filed on Sep. 6, 2019, provisional application No. 62/737,498, filed on Sep. 27, 2018.

(51) Int. Cl.
*C03B 7/07* (2006.01)
*C03B 7/08* (2006.01)

(52) U.S. Cl.
CPC . *C03B 7/07* (2013.01); *C03B 7/08* (2013.01)

(58) Field of Classification Search
None
See application file for complete search history.

(56) References Cited

U.S. PATENT DOCUMENTS 4,541,098 A * 9/1985 Heubach ................. C03B 5/027
373/30
5,002,600 A 3/1991 Sorg et al.
(Continued)

FOREIGN PATENT DOCUMENTS

CN 101932530 A 12/2010
CN 103359914 A 10/2013
(Continued)

OTHER PUBLICATIONS

JP-2012031053-A EPO Machine Translation performed Apr. 29, 2023. (Year: 2023).*
(Continued)

*Primary Examiner* — Lisa L Herring
(74) *Attorney, Agent, or Firm* — Kevin M. Able

(57) ABSTRACT

Disclosed herein are modular molten glass delivery apparatuses and glass manufacturing apparatuses including the same. A module of a modular molten glass delivery apparatus includes a lower carriage comprising a plurality of lower carriage rollers. An upper rail system is supported on the lower carriage. The upper rail system includes upper support rails oriented at an elevation angle $\alpha$ greater than 0 degrees relative to horizontal. The module further includes an upper carriage. The upper carriage includes a base plate oriented at an elevation angle $\beta$ greater than 0 degrees relative to horizontal and a plurality of upper carriage rollers engaged with the upper support rails of the upper rail system to facilitate translation of the upper carriage on the upper rail system. A support frame is coupled to the base plate and a molten glass delivery conduit assembly is supported on the base plate within the support frame.

24 Claims, 16 Drawing Sheets

(56) References Cited

U.S. PATENT DOCUMENTS

| | | |
|---|---|---|
| 7,150,165 B2 | 12/2006 | Pitbladdo |
| 7,377,132 B2 | 5/2008 | Hamashima et al. |
| 8,196,434 B2 | 6/2012 | Pitbladdo |
| 8,240,170 B2 | 8/2012 | De et al. |
| 8,402,787 B2 | 3/2013 | Purnode et al. |
| 8,408,029 B2 | 4/2013 | De et al. |
| 8,857,219 B2 | 10/2014 | De et al. |
| 8,925,353 B2 | 1/2015 | Fraley et al. |
| 9,546,103 B2 | 1/2017 | Niewiera |
| 9,725,349 B2 | 8/2017 | Demirbas et al. |
| 2004/0154336 A1 | 8/2004 | Pitbladdo |
| 2006/0242995 A1 | 11/2006 | Bookbinder et al. |
| 2009/0120133 A1 | 5/2009 | Fraley et al. |
| 2016/0031746 A1 | 2/2016 | Niewiera |
| 2016/0039702 A1* | 2/2016 | Nagai .................. C04B 35/101 65/374.13 |
| 2017/0197863 A1 | 7/2017 | Lansberry et al. |
| 2017/0299112 A1* | 10/2017 | Sauret ...................... B61B 5/02 |
| 2018/0273416 A1 | 9/2018 | Demirbas et al. |
| 2020/0299171 A1* | 9/2020 | Tenyama ............. C03B 17/064 |

FOREIGN PATENT DOCUMENTS

| | | | |
|---|---|---|---|
| CN | 103476716 A | | 12/2013 |
| CN | 104512995 A | | 4/2015 |
| CN | 105008290 A | | 10/2015 |
| CN | 107265833 A | | 10/2017 |
| CN | 214240777 U | * | 9/2021 |
| EP | 2694446 B1 | | 3/2015 |
| GB | 0154861 A | | 12/1920 |
| JP | 2005-272181 A | | 10/2005 |
| JP | 2012-031053 A | | 2/2012 |
| JP | 2012031053 A | * | 2/2012 ............ C03B 18/16 |
| JP | 2013-010672 A | | 1/2013 |
| JP | 2014-009125 A | | 1/2014 |
| JP | 2014-047084 A | | 3/2014 |
| JP | 2014-069979 A | | 4/2014 |
| KR | 10-2019-0003381 A | | 1/2019 |
| TW | 200708489 A | | 3/2007 |
| TW | 200718664 A | | 5/2007 |
| TW | 201343581 A | | 11/2013 |
| TW | 201711967 A | | 4/2017 |
| TW | 201722804 A | | 7/2017 |
| TW | 201726564 A | | 8/2017 |
| WO | 2012/026254 A1 | | 3/2012 |
| WO | 2012/132368 A1 | | 10/2012 |
| WO | 2013/150912 A1 | | 10/2013 |
| WO | 2014/050824 A1 | | 4/2014 |
| WO | 2017/035174 A1 | | 3/2017 |
| WO | 2017/053527 A1 | | 3/2017 |
| WO | 2018/017398 A1 | | 1/2018 |
| WO | 2018/110217 A1 | | 6/2018 |
| WO | 2018/146908 A1 | | 8/2018 |
| WO | 2020/068750 A1 | | 4/2020 |

OTHER PUBLICATIONS

CN214240777U Clarivate Analytics Machine Translation Performed Apr. 30, 2023 (Year: 2023).*

International Search Report and Written Opinion of the International Searching Authority;PCT/US2019/052071; dated Jan. 29, 2020, 13 pages; European Patent Office.

Chinese Patent Application No. 201980076804.0, Office Action, dated Sep. 30, 2022, 29 pages, (16 pages of English Translation and 13 pages of Original Copy); Chinese Patent Office.

Chinese Patent Application No. 201980076808.9, Office Action, dated Oct. 8, 2022, 13 pages (7 pages of English Translation and 6 pages of Original Copy); Chinese Patent Office.

Indian Patent Application No. 202117013330, Office Action dated Aug. 30, 2022, 6 pages, Indian Patent Office.

International Search Report and Written Opinion of the International Searching Authority;PCT/US2019/52601; dated Mar. 2, 2020, 14 pages; European Patent Office.

Taiwanese Patent Application No. 108134581, Office Action, dated Apr. 26, 2023, 1 page; Taiwanese Patent Office.

* cited by examiner

MODULAR MOLTEN GLASS DELIVERY APPARATUS

CROSS-REFERENCE TO RELATED APPLICATIONS

This application is a national stage application under 35 U.S.C. § 371 of International Application No. PCT/US2019/052601, filed on Sep. 24, 2019, which claims the benefit of priority of U.S. Provisional Application Ser. No. 62/896,702 filed on Sep. 6, 2019 and U.S. Provisional Application Ser. No. 62/737,498 filed on Sep. 27, 2018 the contents of which are relied upon and incorporated herein by reference in their entireties as if fully set forth below.

FIELD

The present specification relates to glass manufacturing apparatuses and, more particularly, to glass manufacturing apparatuses with modular molten glass delivery apparatuses and molten glass delivery conduits for use therewith.

TECHNICAL BACKGROUND

Glass manufacturing apparatuses can include a variety of discrete components for melting, processing, and forming glass. For example, a typical glass manufacturing apparatus may include, among other components, a melter for melting a batch of glass constituent components to form a molten material precursor (e.g., molten glass), a fining system for removing dissolved gasses from the molten glass, a mixing vessel for homogenizing the molten glass, and a forming apparatus for forming the molten glass into a desired shape (e.g., a ribbon, cylinders, tubes, etc.). The components of the glass manufacturing apparatus may be connected in series through a plurality of delivery conduits through which the molten glass flows from one component to the next. The delivery conduits may be formed from refractory metals, such as platinum, platinum alloys, and the like, to withstand the relatively high temperatures and corrosive nature of the molten glass.

The components of the glass manufacturing apparatus may be subjected to high temperatures for extended periods. Cycling between room temperature conditions and the high temperature operating conditions of the glass manufacturing apparatus may introduce stresses to the components of the glass manufacturing apparatus. Regular and continuous introduction of stresses to the components of the glass manufacturing apparatus may lead to premature failure of the components. Further, increasing the throughput of molten glass through the glass manufacturing apparatus may necessitate the use of higher temperatures to ensure proper flow of the molten glass through the glass manufacturing apparatus. Higher operating temperatures may further increase the stresses introduced in the components of the glass manufacturing apparatus and, in turn, reduce the service life of the components.

Accordingly, a need exists for alternative designs for components of the glass manufacturing apparatuses that mitigate stress on the components and thereby extend the service life of the components.

SUMMARY

In a first aspect, a glass manufacturing apparatus comprising a molten glass delivery apparatus, the molten glass delivery apparatus comprising at least one module comprising: a lower carriage comprising a plurality of lower carriage rollers; an upper rail system supported on the lower carriage, the upper rail system comprising a pair of upper support rails oriented at an elevation angle $\alpha$ greater than 0 degrees relative to horizontal; and an upper carriage comprising: a base plate oriented at an elevation angle $\beta$ greater than 0 degrees relative to horizontal; and a plurality of upper carriage rollers coupled to the base plate and engaged with the pair of upper support rails of the upper rail system.

A second aspect includes the glass manufacturing apparatus of any of the preceding aspects wherein the elevation angle $\alpha$ is equal to the elevation angle $\beta$.

A third aspect includes the glass manufacturing apparatus of the first aspect further comprising a lower rail system comprising a pair of lower support rails, the plurality of lower carriage rollers of the lower carriage engaged with the pair of lower support rails.

A fourth aspect includes the glass manufacturing apparatus of any of the preceding aspects further comprising an expansion assist member coupled to the lower carriage, the expansion assist member configured to apply an expansion assist force to the lower carriage.

A fifth aspect includes the glass manufacturing apparatus of any of the preceding aspects further comprising a mass compensation member coupled to the upper carriage and the upper rail system, the mass compensation member configured to apply an upward mass compensating force to the upper carriage along the upper rail system.

A sixth aspect includes the glass manufacturing apparatus of any of the preceding aspects further comprising an expansion assist member coupled to the lower carriage, the expansion assist member configured to apply an expansion assist force to the lower carriage.

A seventh aspect includes the glass manufacturing apparatus of any of the preceding aspects wherein a horizontal component of the upward mass compensating force is opposite a horizontal component of the expansion assist force.

An eighth aspect includes the glass manufacturing apparatus of any of the preceding aspects further comprising a support frame coupled to the base plate of the upper carriage, wherein the support frame comprises: vertical support members coupled to the base plate with lateral spring elements such that the vertical support members are displaceable in a lateral direction relative to the base plate; and horizontal support members coupled to the vertical support members with vertical spring elements and lateral spring elements such that the horizontal support members are displaceable in a vertical direction relative to the vertical support members and the vertical support members are displaceable in the lateral direction relative to the horizontal support members.

A ninth aspect includes the glass manufacturing apparatus of any of the preceding aspects wherein the support frame comprises: vertical support plates coupled to the vertical support members and positioned between the vertical support members and the molten glass delivery conduit assembly; and a horizontal support plate coupled to the horizontal support members and positioned between the horizontal support members and the molten glass delivery conduit assembly.

A tenth aspect includes the glass manufacturing apparatus of any of the preceding aspects further comprising a molten glass delivery conduit assembly supported on the upper carriage assembly, wherein the molten glass delivery conduit assembly comprises: a cradle assembly comprising an upper cradle block formed from refractory ceramic material and a lower cradle block formed from refractory ceramic material; a tube assembly positioned in the cradle assembly and extending in a longitudinal direction of the molten glass delivery conduit assembly, the tube assembly comprising an upper tube portion formed from refractory ceramic material and a lower tube portion formed from refractory ceramic material; and a delivery conduit positioned in the tube assembly and extending in the longitudinal direction, the delivery conduit formed from refractory metal.

An eleventh aspect includes the glass manufacturing apparatus of any of the preceding aspects further comprising: a keyway formed between the lower tube portion and the lower cradle block, the keyway extending in a lateral direction transverse to the longitudinal direction; and a key coupling the lower tube portion and the lower cradle block positioned in the keyway.

A twelfth aspect includes the glass manufacturing apparatus of any of the preceding aspects wherein the molten glass delivery conduit assembly further comprises refractory block positioned around the cradle assembly, the refractory block formed from refractory ceramic material.

A thirteenth aspect includes the glass manufacturing apparatus of any of the preceding aspects further comprising: a keyway formed between the lower cradle block and the refractory block, the keyway extending in a lateral direction transverse to the longitudinal direction; and a key coupling the lower cradle block and the refractory block positioned in the keyway.

A fourteenth aspect includes the glass manufacturing apparatus of any of the preceding aspects wherein the upper tube portion comprises a plurality of tube segments extending in the longitudinal direction and arranged in an arch around a portion of the delivery conduit.

A fifteenth aspect includes the glass manufacturing apparatus of any of the preceding aspects further comprising at least one flange coupled to the delivery conduit at a longitudinal end of the delivery conduit.

A sixteenth aspect includes the glass manufacturing apparatus of any of the preceding aspects wherein the at least one flange comprises a bus portion coupled to a delivery cable and a distribution portion in contact with the delivery conduit.

A seventeenth aspect includes the glass manufacturing apparatus of any of the preceding aspects further comprising a translatable support coupled to the bus portion and a spring element configured to apply a force to the bus portion in a vertical direction.

A eighteenth aspect includes the glass manufacturing apparatus of any of the preceding aspects wherein the translatable support is electrically isolated from the bus portion of the at least one flange.

A nineteenth aspect includes a glass manufacturing apparatus comprising a molten glass delivery conduit assembly comprising: a cradle assembly comprising an upper cradle block formed from refractory ceramic material and a lower cradle block formed from refractory ceramic material; a tube assembly positioned in the cradle assembly and extending in a longitudinal direction of the molten glass delivery conduit assembly, the tube assembly comprising an upper tube portion formed from refractory ceramic material and a lower tube portion formed from refractory ceramic material; a keyway formed between the lower tube portion and the lower cradle block, the keyway extending in a lateral direction transverse to the longitudinal direction; and a key coupling the lower tube portion and the lower cradle block positioned in the keyway.

A twentieth aspect includes the glass manufacturing apparatus of any of the preceding aspects, further comprising refractory block positioned around the cradle assembly, the refractory block formed from refractory ceramic material.

A twenty-first aspect includes the glass manufacturing apparatus of any of the preceding aspects further comprising: a keyway formed between the lower cradle block and the refractory block, the keyway extending in a lateral direction transverse to the longitudinal direction of the molten glass delivery conduit assembly; and a key coupling the lower cradle block and the refractory block positioned in the keyway.

A twenty-second aspect includes the glass manufacturing apparatus of any of the preceding aspects wherein the upper tube portion comprises a plurality of tube segments extending in the longitudinal direction and arranged in an arch.

A twenty-third aspect includes the glass manufacturing apparatus of any of the preceding aspects further comprising a delivery conduit formed from refractory metal positioned in the tube assembly and extending in the longitudinal direction.

A twenty-fourth aspect includes the glass manufacturing apparatus of any of the preceding aspects further comprising a flange coupled to the delivery conduit at a longitudinal end of the delivery conduit.

Additional features and advantages of the modular molten glass delivery apparatuses and glass manufacturing apparatuses comprising the same described herein will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description explain the principles and operations of the claimed subject matter.

DETAILED DESCRIPTION

Figure 3:
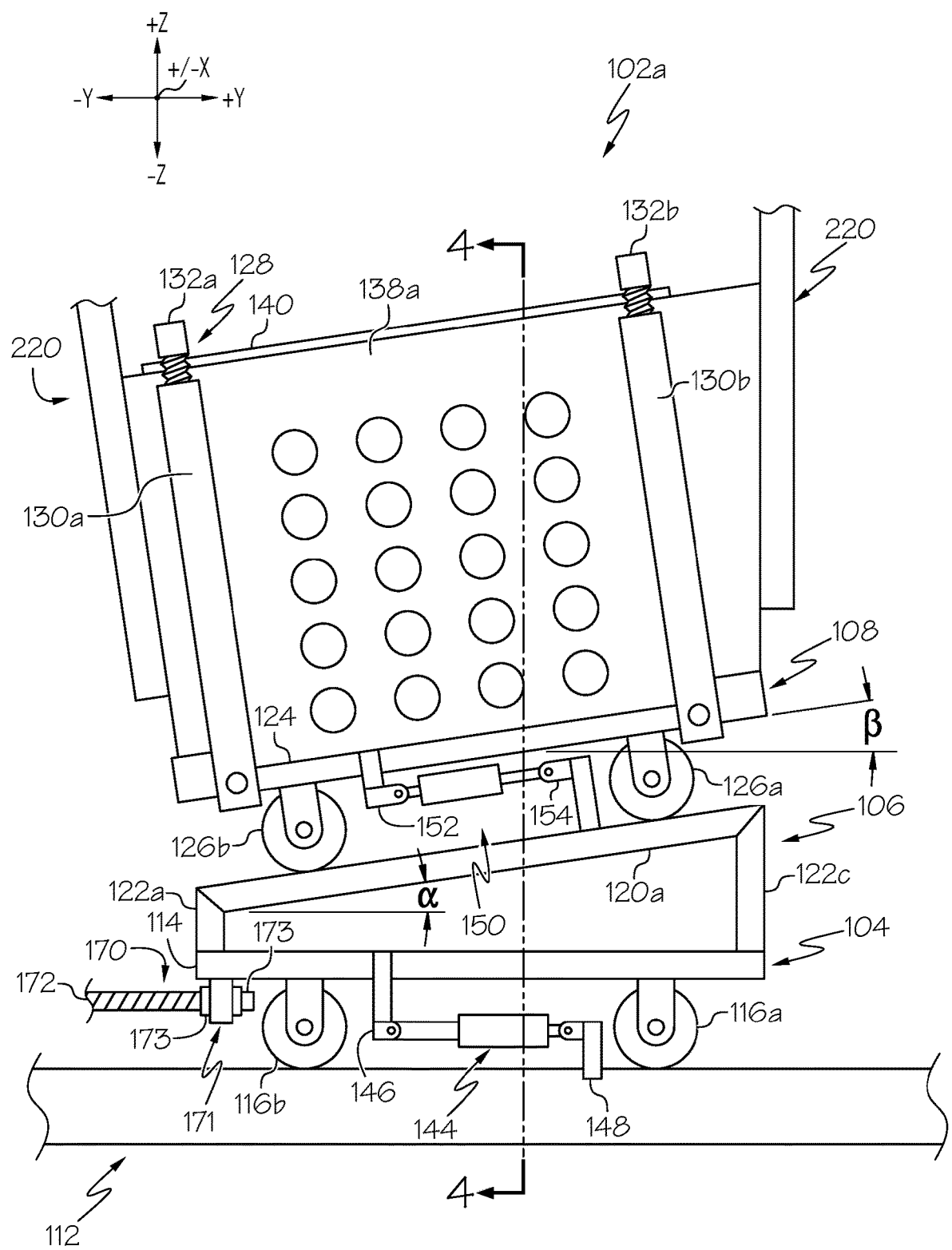
FIG. 3 schematically depicts a module of the modular molten glass delivery apparatus of FIG. 2, according to one or more embodiments shown and described herein.

Reference will now be made in detail to embodiments of modular molten glass delivery apparatuses described herein and glass manufacturing apparatuses comprising the same, examples of which are illustrated in the accompanying drawings. Whenever possible, the same reference numerals will be used throughout the drawings to refer to the same or like parts. One embodiment of a module of a modular molten glass delivery apparatus is schematically depicted in FIG. 3. The module can comprise a lower carriage comprising a plurality of lower carriage rollers. The upper rail system may be supported on the lower carriage. The upper rail system may comprise a pair of upper support rails oriented at an elevation angle α greater than 0 degrees relative to horizontal. The module may further comprise an upper carriage. The upper carriage may comprise a base plate oriented at an elevation angle β greater than 0 degrees relative to horizontal and a plurality of upper carriage rollers coupled to the base plate and engaged with the pair of upper support rails of the upper rail system to facilitate translation of the upper carriage on the upper rail system. A support frame may be coupled to the base plate and a molten glass delivery conduit assembly may be supported on the base plate within the support frame. Various embodiments of modular molten glass delivery apparatuses, molten glass delivery conduits for use therewith, and glass manufacturing apparatuses comprising the same will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Figure 1:
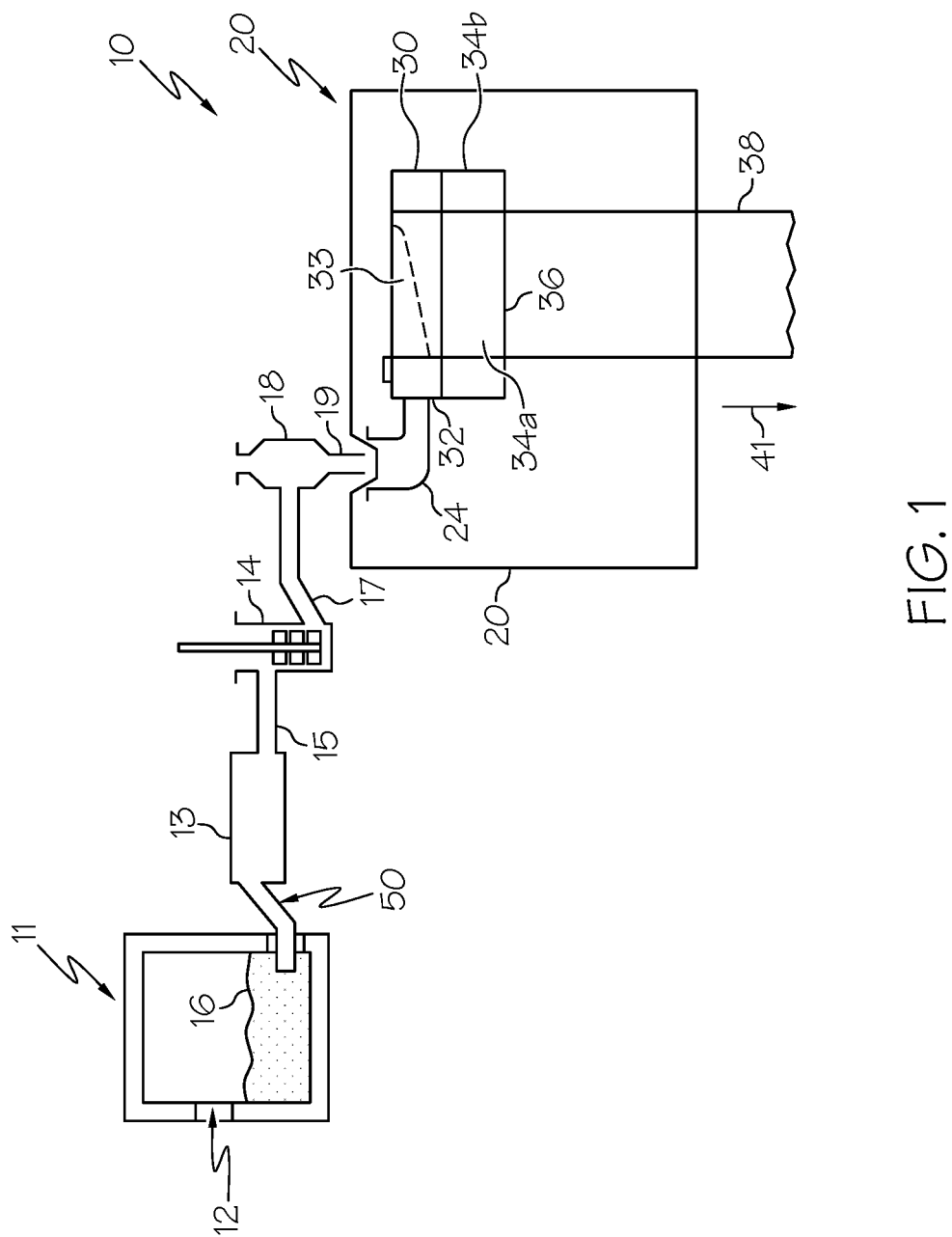
FIG. 1 schematically depicts a glass manufacturing apparatus according to one or more embodiments shown and described herein.

Referring to FIG. 1 by way of example, an embodiment of a glass manufacturing apparatus 10 for forming glass articles from molten glass is schematically depicted. The glass manufacturing apparatus 10 may include a melter 11, a fining system 13, a mixing vessel 14, a delivery vessel 18, and a forming apparatus 20. Glass batch materials are introduced into the melter 11 through a batch inlet port 12. The batch materials are melted in the melter 11 to form molten glass 16. The melter 11 is fluidly coupled to the fining system 13 with a connecting tube 50. The molten glass 16 flows from the melter 11, through the connecting tube 50, and into the fining system 13.

The fining system 13 may comprise a high temperature processing area that receives the molten glass 16 from the melter 11. While the molten glass 16 is resident in the fining system 13, dissolved gasses and/or bubbles are removed from the molten glass 16. The fining system 13 may be fluidly coupled to the mixing vessel 14 by a connecting tube 15. That is, molten glass flowing from the fining system 13 to the mixing vessel 14 may flow through the connecting tube 15. As the molten glass 16 passes through the mixing vessel 14, the molten glass 16 may be stirred to homogenize the molten glass. The mixing vessel 14 may be, in turn, fluidly coupled to the delivery vessel 18 by a connecting tube 17 such that molten glass flowing from the mixing vessel 14 to the delivery vessel 18 flows through the connecting tube 17.

The delivery vessel 18 supplies the molten glass 16 through a downcomer 19 into the forming apparatus 20. The forming apparatus 20 may be, for example and without limitation, a fusion draw machine or another forming apparatus for forming molten glass into a glass article such as ribbons, tubes, boules, or the like. In the embodiment depicted in FIG. 1 the forming apparatus 20 is a fusion draw machine that comprises an enclosure 22 in which an inlet 24 and a forming vessel 30 are positioned. The molten glass 16 from the downcomer 19 flows into the inlet 24, which leads to the forming vessel 30. The forming vessel 30 includes an opening 32 that receives the molten glass 16. The molten glass 16 may flow into a trough 33 and then overflows and runs down two converging sides 34a and 34b of the forming vessel 30 before fusing together at a root 36 of the forming vessel 30, where the two sides join, before being contacted and drawn in a downstream direction 41 to form a continuous glass ribbon 38.

While FIG. 1 schematically depicts a glass manufacturing apparatus 10 for forming glass ribbon using a fusion draw machine, other processes may be used to form the glass ribbon, including, without limitation, float glass processes, slot draw processes or the like. Further, while the glass manufacturing apparatus 10 is depicted as being used for forming glass ribbon, other glass manufacturing apparatuses may be used for forming glass stock material other than glass sheets including, without limitation, glass tubes, glass cylinders, boules, and the like.

The glass manufacturing apparatus 10 may be constructed at room temperature and thereafter operated at elevated temperatures. Heating the components of the glass manufacturing apparatus 10 to operating temperatures increases the dimensional size of the components according to their respective coefficients of thermal expansion. For example, the connecting tubes 15, 17, and 50 may be formed from refractory metals and may thermally expand upon heating. The thermal expansion introduces stress into the connecting tubes 15, 17, and 50. Additional stress may be imparted to the connecting tubes 15, 17, and 50 if the thermal expansion of the connecting tubes is constrained by adjacent components in the glass manufacturing apparatus 10. For example, connecting tube 50 is positioned between and coupled to the melter 11 and the fining system 13, each of which may also thermally expand upon heating. The thermal expansion of the melter 11 and the fining system 13 may constrain or inhibit the thermal expansion of the connecting tube 50, thereby introducing additional stress in the connecting tube 50. Because of the high operating temperatures of the refractory metal, even low levels of stress that are imparted to the refractory metal of the connecting tubes 15, 17, and 50 may cause creep in the refractory metal, thereby reducing the service life of the connecting tube and increasing the risk of failure. Repair and/or replacement of the connecting tubes is expensive and time consuming and may decrease production yields as the glass manufacturing apparatus may be shut down for extended periods of time to facilitate repair and/or replacement.

Disclosed herein are modular molten glass delivery apparatuses, molten glass delivery conduits for use therewith, and glass manufacturing apparatuses comprising the same. The modular molten glass delivery apparatuses may be used, for example, as connecting tubes between various components of the glass manufacturing apparatus, such as connecting tubes 15, 17, and 50. The modular molten glass delivery apparatuses are constructed to reduce or mitigate stresses introduced in the refractory metal of the modular molten glass delivery apparatuses, thereby prolonging the service life of the modular molten glass delivery apparatuses, increasing production yields, and reducing the operating and maintenance costs of the glass manufacturing apparatuses.

Figure 2:
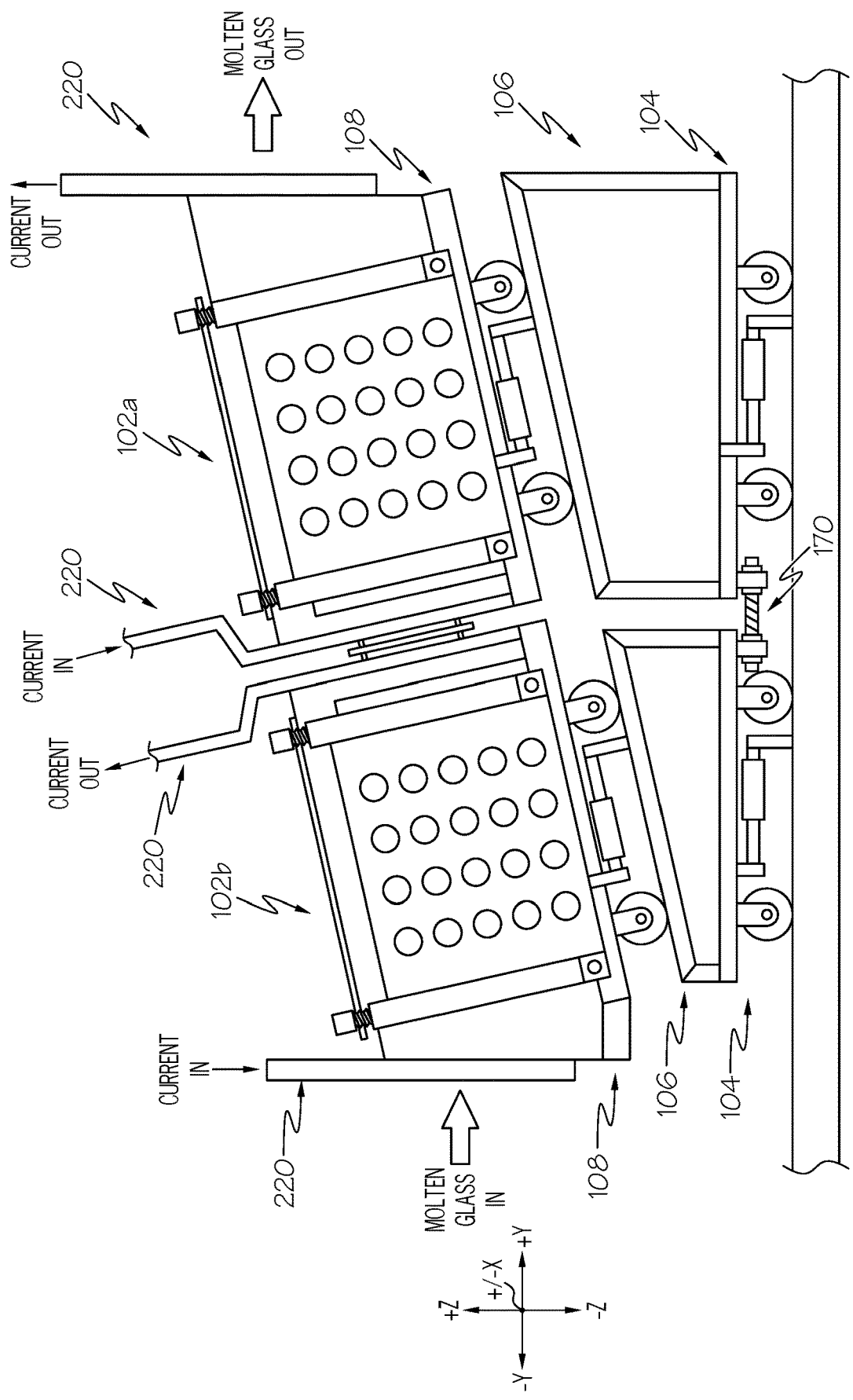
FIG. 2 schematically depicts a modular molten glass delivery apparatus comprising a plurality of modules, according to one or more embodiments shown and described herein.

Referring now to FIGS. 1-2, an example of a modular molten glass delivery apparatus 100 is schematically depicted. In the embodiment depicted in FIG. 2, the modular molten glass delivery apparatus is arranged to couple the melter 11 (FIG. 1) to the fining system 13 (FIG. 1) in the glass manufacturing apparatus 10 (FIG. 1) in place of connecting tube 50. However, the modular molten glass delivery apparatus 100 may be used to couple other components of the glass manufacturing apparatus 10, including without limitation, the fining system 13 and the mixing vessel 14 (i.e., in place of connecting tube 15), the mixing vessel 14 and the delivery vessel 18 (i.e., in place of connecting tube 17), etc. The modular molten glass delivery apparatus 100 may include at least one module. In the embodiment depicted in FIG. 2, the modular molten glass delivery apparatus 100 includes two modules (module 102a and module 102b). However, the modular molten glass delivery apparatus 100 may include one module or greater than two modules. Each of the modules 102a, 102b may comprise a lower carriage 104, an upper rail system 106, an upper carriage 108, and a molten glass delivery conduit assembly 110 (schematically depicted in FIGS. 5-7).

Figure 4:
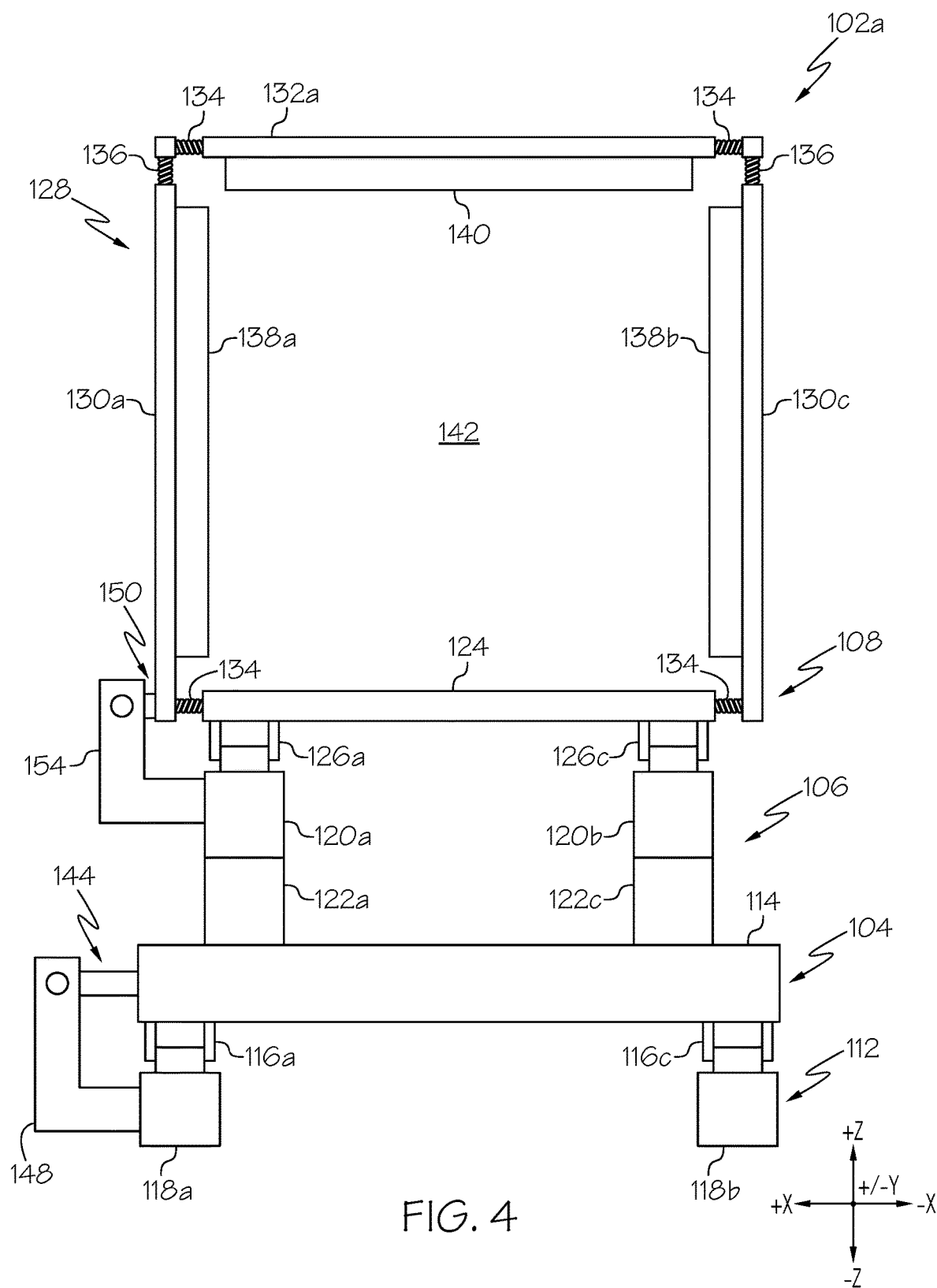
FIG. 4 schematically depicts a cross-section of the module of FIG. 3 without the molten glass delivery conduit assembly, according to one or more embodiments shown and described herein.

Referring now to FIGS. 3 and 4, one module (module 102a) of the modular molten glass delivery apparatus 100 is schematically depicted in profile (FIG. 3) and in vertical cross-section (FIG. 4). Specifically, FIG. 4 depicts a cross-section of the module 102a in the X-Z plane of the coordinate axes depicted in the figures. For ease of description, FIG. 4 depicts the module 102a without the molten glass delivery conduit assembly 110 (described in further detail herein). While specific reference is made herein to the components and structure of module 102a, it should be understood that module 102b includes the same components as module 102a and is similarly constructed.

As depicted in FIGS. 3 and 4, the lower carriage 104 of module 102a may comprise a lower carriage frame 114 and a plurality of lower carriage rollers (three lower carriage rollers 116a, 116b, 116c depicted in FIGS. 3 and 4) coupled to the lower carriage frame 114. In embodiments, the module 102a may further comprise a lower rail system 112. The lower rail system 112 may comprise a pair of lower support rails 118a, 118b. The lower support rails 118a, 118b may be parallel with one another and extend in a longitudinal direction (i.e., the +/−Y direction of the coordinate axes depicted in the figures) of the module 102a. The lower support rails 118a, 118b may have a substantially horizontal orientation (i.e., the lower support rails 118a, 118b are positioned in a plane parallel to the X-Y plane of the coordinate axes depicted in the figures). In embodiments, the plurality of lower carriage rollers 116a, 116b, 116c may each be engaged with one of the lower support rails 118a, 118b to facilitate translation of the lower carriage frame 114 (and hence the lower carriage 104) on the lower rail system 112 in the +/−Y direction of the coordinate axes depicted in the figures. In the embodiments described herein, the lower carriage frame 114 and the lower support rails 118a, 118b may be formed from a load bearing material such as, for example and without limitation, structural steel or a similar load bearing material.

Still referring to FIGS. 3 and 4, the module 102a may further comprise an upper rail system 106. The upper rail system 106 may be supported on the lower carriage frame 114 of the lower carriage 104. The upper rail system 106 may comprise a pair of upper support rails 120a, 120b. The upper support rails 120a, 120b may be parallel with one another and oriented at an elevation angle α relative to horizontal (i.e., relative to the X-Y plane of the coordinate axes depicted in the figures). In the embodiments described herein, the elevation angle α may be greater than 0 degrees. In embodiments, the elevation angle α may be greater than 0 degrees and less than 90 degrees or even greater than 0 degrees and less than or equal to 45 degrees. In some embodiments, the elevation angle α may be less than 0 degrees and greater than −90 degrees or even less than 0 degrees and greater than or equal to −45 degrees. In the embodiment of the module 102a depicted in FIGS. 3 and 4, a spacing between the upper support rails 120a, 120b and the lower carriage frame 114 increases in the +Y direction of the coordinate axes depicted in the figures. The upper support rails 120a, 120b may be supported on the lower carriage frame 114 of the lower carriage 104 with stanchions (three stanchions 122a, 122b, 122c depicted in FIGS. 3 and 4). The difference in the height of stanchions 122a, 122b and stanchion 122c may determine the elevation angle α of the upper support rails 120a, 120b relative to horizontal. Accordingly, in the embodiment of the module 102a depicted in FIGS. 3 and 4, the height of stanchions 122a, 122b may be less than the height of stanchion 122c. Like the lower support rails 118a, 118b and the lower carriage frame 114, the upper support rails 120a, 120b and stanchions 122a, 122b, 122c may be formed from a load bearing material such as, for example and without limitation, structural steel or a similar load bearing material. In the embodiments described herein, the stanchions 122a, 122b, 122c may be coupled to the lower carriage frame 114 and the upper support rails 120a, 120b by welding and/or mechanical fasteners.

In the embodiments described herein, the upper carriage 108 of the module 102a may be supported on the lower carriage 104. Specifically, the upper carriage 108 may comprise a base plate 124 and a plurality of upper carriage rollers (three upper carriage rollers 126a, 126b, 126c depicted in FIGS. 3 and 4) coupled to the base plate 124. In embodiments, the plurality of upper carriage rollers 126a, 126b, 126c may each be engaged with one of the upper support rails 120a, 120b to facilitate translation of the base plate 124 (and hence the upper carriage 108) on the upper rail system 106. The base plate 124 of the upper carriage 108 may be oriented at an elevation angle β relative to horizontal (i.e., relative to the X-Y plane of the coordinate axes depicted in the figures). In the embodiments described herein, the elevation angle β may be greater than 0 degrees. In embodiments, the elevation angle β may be greater than 0 degrees and less than 90 degrees or even greater than 0 degrees and less than or equal to 45 degrees. In embodiments, the elevation angle β may be less than 0 degrees and greater than −90 degrees or even less than 0 degrees and greater than or equal to −45 degrees. In embodiments, the elevation angle β may be equal to the elevation angle α. Due to the angular orientation of the base plate 124 of the upper carriage 108 and the angular orientation of the upper support rails 120a, 120b, the primary vector component of the translational motion of the upper carriage 108 on the upper support rails 120a, 120b may be parallel to the +/−Y direction of the coordinate axes depicted in the figures. In the embodiments described herein, the base plate 124 of the upper carriage 108 may be formed from a load bearing material such as, for example and without limitation, structural steel or a similar load bearing material.

Still referring to FIGS. 3 and 4, the upper carriage 108 may further comprise a support frame 128 coupled to the base plate 124. The support frame 128 supports and reinforces the molten glass delivery conduit assembly 110 (depicted in FIGS. 5-7) positioned within the volume 142 enclosed by the support frame 128 and the base plate 124. In embodiments, the support frame 128 may also be constructed to accommodate the thermal expansion and contraction of the molten glass delivery conduit assembly 110 in the lateral direction of the molten glass delivery conduit assembly 110 (i.e., in the +/−X directions of the coordinate axes depicted in the figures). In embodiments, the support frame 128 may also be constructed to accommodate the thermal expansion and contraction of the molten glass delivery conduit assembly 110 in the vertical direction of the molten glass delivery conduit assembly 110 (i.e., the +/−Z direction of the coordinate axes depicted in the figures).

For example, in embodiments, the support frame 128 may comprise a plurality of vertical support members (vertical support members 130a, 130b, 130c depicted in FIGS. 3 and 4) and a plurality of horizontal support members 132a, 132b. The vertical support members 130a, 130b, 130c and the horizontal support members 132a, 132b may be formed from a load bearing material such as, for example and without limitation, structural steel or a similar load bearing material The lower ends of vertical support members 130a, 130b, 130c (i.e. the ends of the vertical support members in the −Z direction of the coordinate axes depicted in the figures) may be coupled to the base plate 124 of the upper carriage 108 with lateral spring elements 134. Similarly, the upper ends of the vertical support members 130a, 130b, 130c (i.e. the ends of the vertical support members in the +Z direction of the coordinate axes depicted in the figures) may be coupled to the horizontal support members 132a, 132b with lateral spring elements 134. The lateral spring elements 134 may be, for example and without limitation, compression springs, disc springs, spring bolts and/or combinations thereof.

The lateral spring elements 134 may allow for displacement of the vertical support members 130a, 130b, 130c in the +/−X direction of the coordinate axes depicted in the figures (i.e., laterally) to accommodate for the thermal expansion and contraction of a molten glass delivery conduit assembly 110 positioned within the volume 142 enclosed by the support frame 128 and the base plate 124 of the upper carriage 108. That is, as the molten glass delivery conduit assembly 110 is heated within the volume 142 enclosed by the support frame 128 and the base plate 124, the molten glass delivery conduit assembly 110 may expand and exert a force on the vertical support members 130a, 130b, 130c in the +/−X direction. The lateral spring elements 134 allow for the displacement of the vertical support members 130a, 130b, 130c in the +/−X direction, thereby accommodating the thermal expansion of the molten glass delivery conduit assembly 110. Similarly, as the molten glass delivery conduit assembly 110 cools within the volume 142 enclosed by the support frame 128 and the base plate 124, the molten glass delivery conduit assembly 110 contracts away from the vertical support members 130a, 130b, 130c. The lateral spring elements 134 may allow for the displacement of the vertical support members 130a, 130b, 130c in the +/−X direction such that the vertical support members 130a, 130b, 130c remain in contact with the molten glass delivery conduit assembly 110, thereby supporting the molten glass delivery conduit assembly 110 as it cools and contracts.

In addition to the lateral spring elements 134, the support frame 128 may also include vertical spring elements 136. Specifically, the upper ends of the vertical support members 130a, 130b, 130c (i.e. the ends of the vertical support members in the +Z direction of the coordinate axes depicted in the figures) may be coupled to the horizontal support members 132a, 132b with vertical spring elements 136. The vertical spring elements 136 may be, for example and without limitation, compression springs, disc springs, spring bolts and/or combinations thereof.

The vertical spring elements 136 may allow for displacement of the horizontal support members 132a, 132b in the +/−Z direction of the coordinate axes depicted in the figures (i.e., vertically) to accommodate for the thermal expansion and contraction of a molten glass delivery conduit assembly 110 positioned within the volume 142 enclosed by the support frame 128 and the base plate 124. That is, as the molten glass delivery conduit assembly 110 is heated within the volume 142 enclosed by the support frame 128 and the base plate 124, the molten glass delivery conduit assembly 110 expands and exerts a force on the horizontal support members 132a, 132b in the +Z direction. The vertical spring elements 136 may allow for displacement of the horizontal support members 132a, 132b in the +Z direction, thereby accommodating thermal expansion of the molten glass delivery conduit assembly 110. Similarly, as the molten glass delivery conduit assembly 110 cools within the volume 142 enclosed by the support frame 128 and the base plate 124, the molten glass delivery conduit assembly 110 contracts away from the horizontal support members 132a, 132b. The vertical spring elements 136 may allow for displacement of the horizontal support members 132a, 132b in the −Z direction such that the horizontal support members 132a, 132b remain in contact with the molten glass delivery conduit assembly 110, thereby supporting the molten glass delivery conduit assembly 110 as it cools and contracts.

Figure 5:
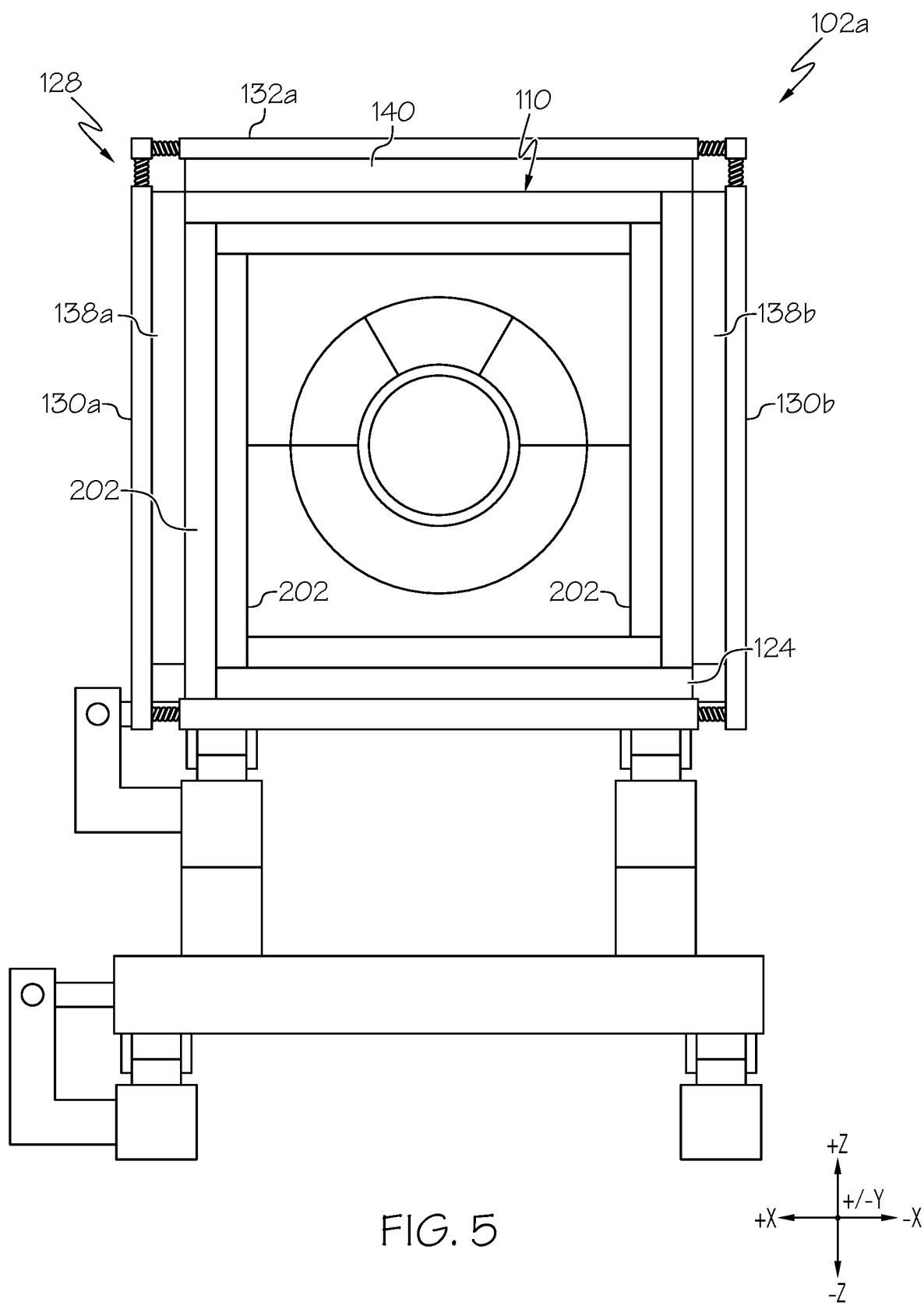
FIG. 5 schematically depicts a cross-section of the module of FIG. 3 with the molten glass delivery conduit assembly, according to one or more embodiments shown and described herein.

In embodiments, the support frame 128 of the upper carriage 108 may further comprise vertical support plates (two vertical support plates 138a, 138b are depicted in FIGS. 3 and 4) and/or horizontal support plates (one horizontal support plate 140 is depicted in FIGS. 3 and 4) to provide additional support to a molten glass delivery conduit assembly 110 positioned within the volume 142 enclosed by the support frame 128 and the base plate 124. For example, in embodiments, the support frame 128 may further comprise vertical support plates 138a, 138b disposed within the volume 142 enclosed by the support frame 128 and the base plate 124. Vertical support plate 138a may be coupled to the vertical support members 130a, 130b, such as by welding, mechanical fasteners or the like, such that the vertical support plate 138a is disposed between the vertical support members 130a, 130b and a molten glass delivery conduit assembly 110 positioned in the volume 142 enclosed by the support frame 128 and the base plate 124 (e.g., as depicted in FIG. 5). Similarly, vertical support plate 138b may be coupled to the vertical support member 130c, such as by welding, mechanical fasteners or the like, such that the vertical support plate 138a is disposed between the vertical support member 130c and a molten glass delivery conduit assembly 110 positioned in the volume 142 enclosed by the support frame 128 and the base plate 124 (e.g., as depicted in FIG. 5). The vertical support plates 138a, 138b may be formed from a load bearing material such as, for example and without limitation, structural steel or a similar load bearing material. The vertical support plates 138a, 138b may allow for the force exerted by the molten glass delivery conduit assembly 110 on the vertical support members 130a, 130b, 130c (and vice-versa) to be uniformly distributed along the longitudinal length of the molten glass delivery conduit assembly 110 (i.e., the length of the molten glass delivery conduit assembly 110 generally in the +/−Y direction of the coordinate axes depicted in the figures) such that the molten glass delivery conduit assembly 110 is uniformly supported by the support frame 128 during thermal expansion and contraction and in between periods of thermal expansion and contraction.

In embodiments, the support frame 128 further comprises a horizontal support plate 140 disposed within the volume 142 enclosed by the support frame 128 and the base plate 124. Horizontal support plate 140 may be coupled to the horizontal support members 132a, 132b, such as by welding, mechanical fasteners or the like, such that the horizontal support plate 140 is disposed between the horizontal support members 132a, 132b and a molten glass delivery conduit assembly 110 positioned in the volume 142 enclosed by the support frame 128 and the base plate 124 (e.g., as depicted in FIG. 5). The horizontal support plate 140 may be formed from a load bearing material such as, for example and without limitation, structural steel or a similar load bearing material. The horizontal support plate 140 may allow for the force exerted by the molten glass delivery conduit assembly 110 on the horizontal support members 132a, 132b (and vice-versa) to be uniformly distributed along the longitudinal length of the molten glass delivery conduit assembly 110 such that the molten glass delivery conduit assembly 110 is uniformly supported by the support frame 128 during thermal expansion and contraction and in between periods of thermal expansion and contraction.

Still referring to FIGS. 3 and 4, in embodiments, the module 102a may further comprise an expansion assist member 144 to assist with translation of the lower carriage 104 along the lower support rails 118a, 118b of the lower rail system 112. Specifically, during thermal expansion and contraction of a molten glass delivery conduit assembly 110 positioned within the volume 142 enclosed by the support frame 128 and the base plate 124, the longitudinal length of all or part of the molten glass delivery conduit assembly 110 may increase (thermal expansion) or decrease (thermal contraction), causing the lower carriage 104 to translate along the lower support rails 118a, 118b of the lower rail system 112. Despite the incorporation of a plurality of lower carriage rollers 116a, 116b, 116c between the lower carriage 104 and the lower support rails 118a, 118b, the large mass of the module 102a may make it difficult to overcome the static inertia of the module 102a and thereby set the module 102a in motion on the plurality of lower carriage rollers 116a, 116b, 116c. If the static inertia of the module 102a is not overcome, additional stress may be imparted to the molten glass delivery conduit assembly 110, potentially resulting in damage and/or failure of the molten glass delivery conduit assembly 110. The expansion assist member 144 may assist in overcoming the static inertia of the module 102a by providing an expansion assist force to the lower carriage 104 in the direction of longitudinal expansion (i.e., expansion in a direction of the longitudinal length of the molten glass delivery conduit assembly 110) when the molten glass delivery conduit assembly 110 is heated.

Specifically, the expansion assist member 144 may comprise a spring member, such as a pneumatic cylinder, a hydraulic cylinder, a compression spring, or the like, which exerts a biasing force in one direction (i.e., the expansion assist member behaves as a single-acting cylinder). In the embodiments described herein, the biasing force may be in the direction of longitudinal expansion of the molten glass delivery conduit assembly 110 (i.e., the +/−Y direction of the coordinate axes depicted in the figures). The expansion assist member 144 may be coupled to the lower carriage 104 with carriage bracket 146 and to the lower support rail 118a with rail bracket 148 such that the expansion assist member 144 is mechanically grounded to the lower support rail 118a. The expansion assist member 144 may apply an expansion assist force to the lower carriage 104 through the carriage bracket in either the + or −Y direction to aid in overcoming the static inertia of the module 102a and encouraging the translation of the lower carriage 104 as the molten glass delivery conduit assembly 110 is heated and thermally expands.

In embodiments, the module 102a may further comprise a mass compensation member 150 to counteract the mass of the upper carriage 108 and the molten glass delivery conduit assembly 110 along the upper support rails 120a, 120b of the upper rail system 106 and thereby prevent unwanted motion of the upper carriage 108 along the upper support rails 120a, 120b of the upper rail system 106. Specifically, as noted herein, the upper support rails 120a, 120b of the upper rail system 106 may be oriented at an elevation angle α relative to horizontal and the plurality of upper carriage rollers 126a, 126b, 126c are engaged with the upper support rails 120a, 120b of the upper rail system 106. Accordingly, without any additional compensation or restraint, the upper carriage 108 will translate down the upper support rails 120a, 120b due to gravity. Moreover, when components of the module 102a expand, the expansion may be inhibited by the force of gravity acting on the module 102a which, in turn, may introduce stress into the components. To prevent this unwanted motion and to mitigate the introduction of stress, the module 102a may comprise a mass compensation member 150 configured to apply an upward mass compensating force to the upper carriage 108 along the upper rail system 106.

Specifically, the mass compensation member 150 may comprise a spring member, such as a pneumatic cylinder, a hydraulic cylinder, a compression spring or the like, which exerts a biasing force in one direction (i.e., the mass compensation member 150 behaves as a single-acting cylinder). In the embodiments described herein, the mass compensation member 150 may be coupled to the upper carriage 108 with carriage bracket 152 and to the upper support rail 120a with rail bracket 154 such that the mass compensation member 150 is mechanically grounded to the upper support rail 120a and the biasing force of the mass compensation member 150 is parallel to the upper support rail 120a with a force component in the upward vertical direction (i.e., the +Z direction of the coordinate axes depicted in the figures). The mass compensation member 150 may apply an upward mass compensating force along the upper rail system 106 (specifically along the upper support rails 120a, 120b) and to the upper carriage 108 through the carriage bracket 152 to prevent motion of the upper carriage 108 down the upper support rails 120a, 120b due to gravity. In embodiments, a horizontal component of the upward mass compensating force applied by the mass compensation member 150 may be opposite a horizontal component of the expansion assist force applied by the expansion assist member 144. The mass compensation member 150 may also aid in accommodating thermal expansion of molten glass delivery conduit assembly 110 as the module 102a is heated by facilitating translation of the upper carriage 108 on the upper rail system 106 against the downward force of gravity acting on the module 102a.

Referring again to FIGS. 2 and 3, in embodiments, the lower carriage 104 of the module 102a may comprise a carriage coupler 170 affixed to the lower carriage frame 114. In embodiments, the carriage coupler 170 may include a collar block 171 and a threaded rod 172. The threaded rod 172 may be inserted through the collar block 171 and secured in position with jam nuts 173. The carriage coupler 170 may be used, for example, to secure the module 102a to an adjacent module 102b, thereby maintaining the relative position of the modules with respect to one another.

Figure 6A:
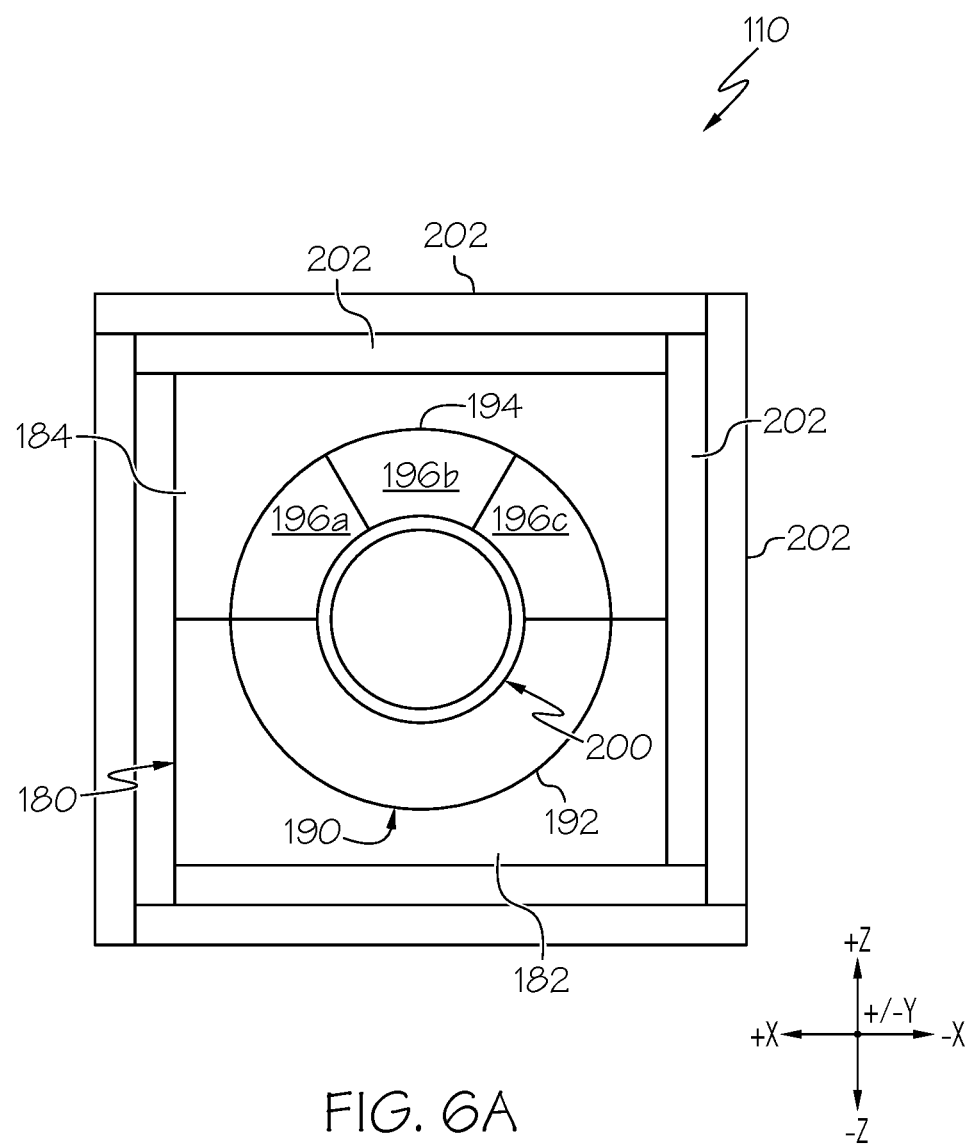
FIG. 6A schematically depicts a vertical cross-section of the molten glass delivery conduit assembly of the module of FIG. 5, according to one or more embodiments shown and described herein.
Figure 6B:
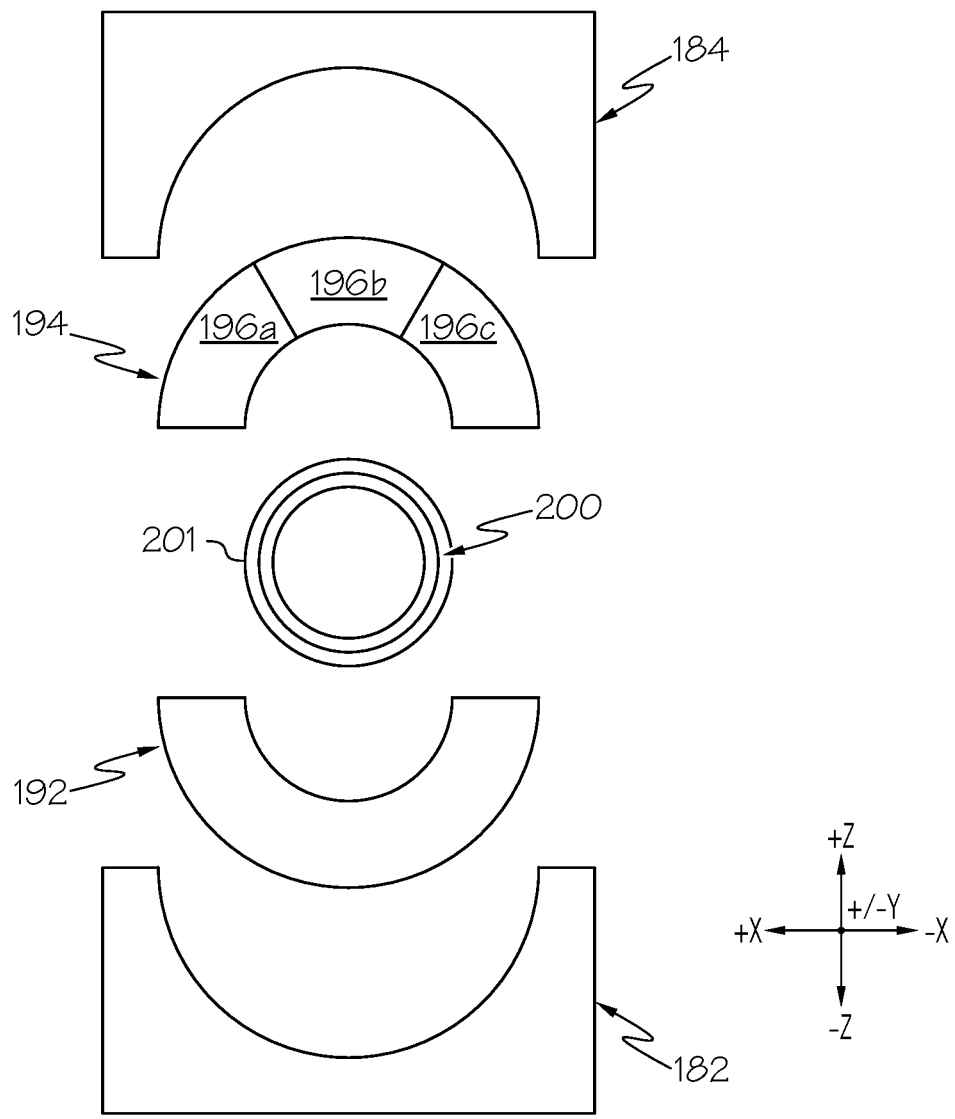
FIG. 6B schematically depicts an exploded view of a portion of the molten glass delivery conduit assembly of FIG. 6A.
Figure 6C:
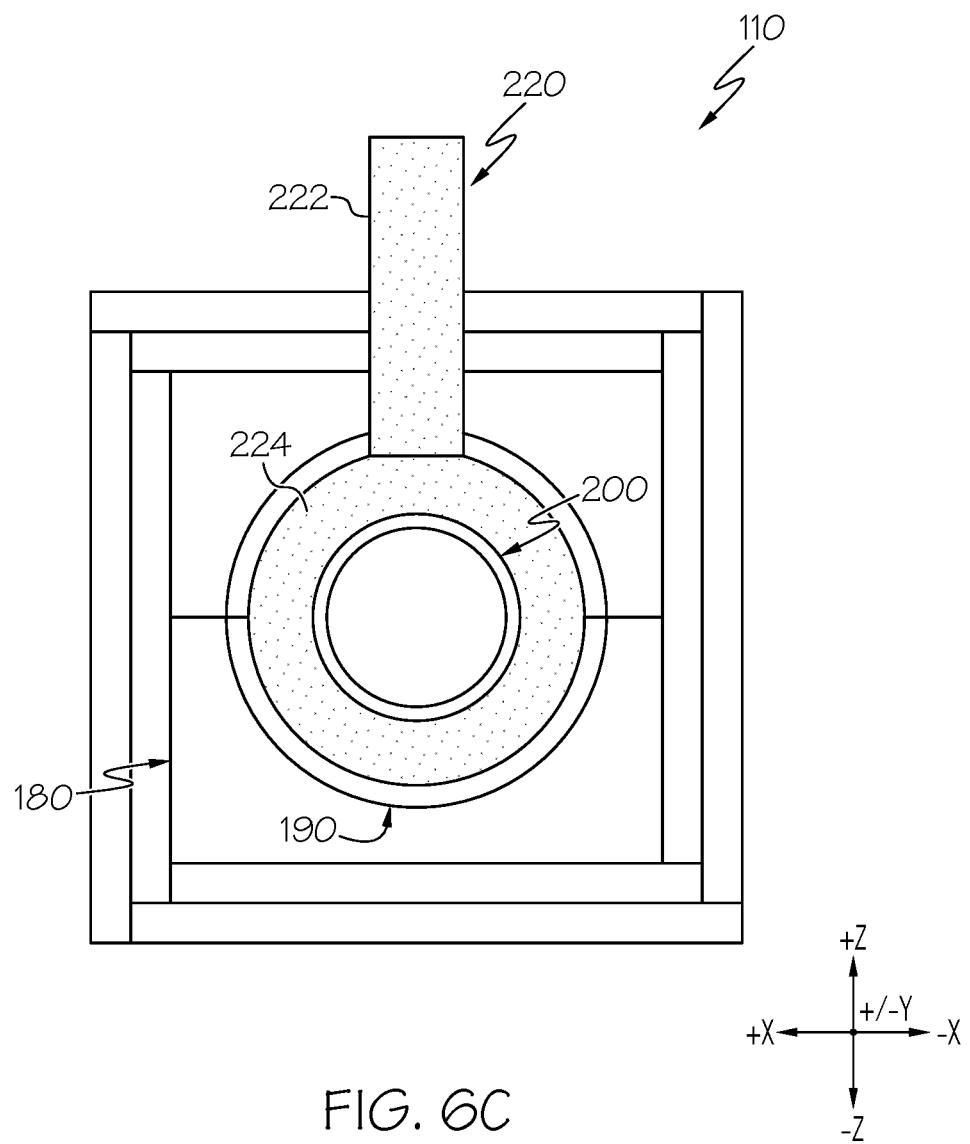
FIG. 6C schematically depicts a vertical cross-section of the molten glass delivery conduit assembly of the module of FIG. 5 with a flange affixed thereto, according to one or more embodiments shown and described herein.
Figure 7:
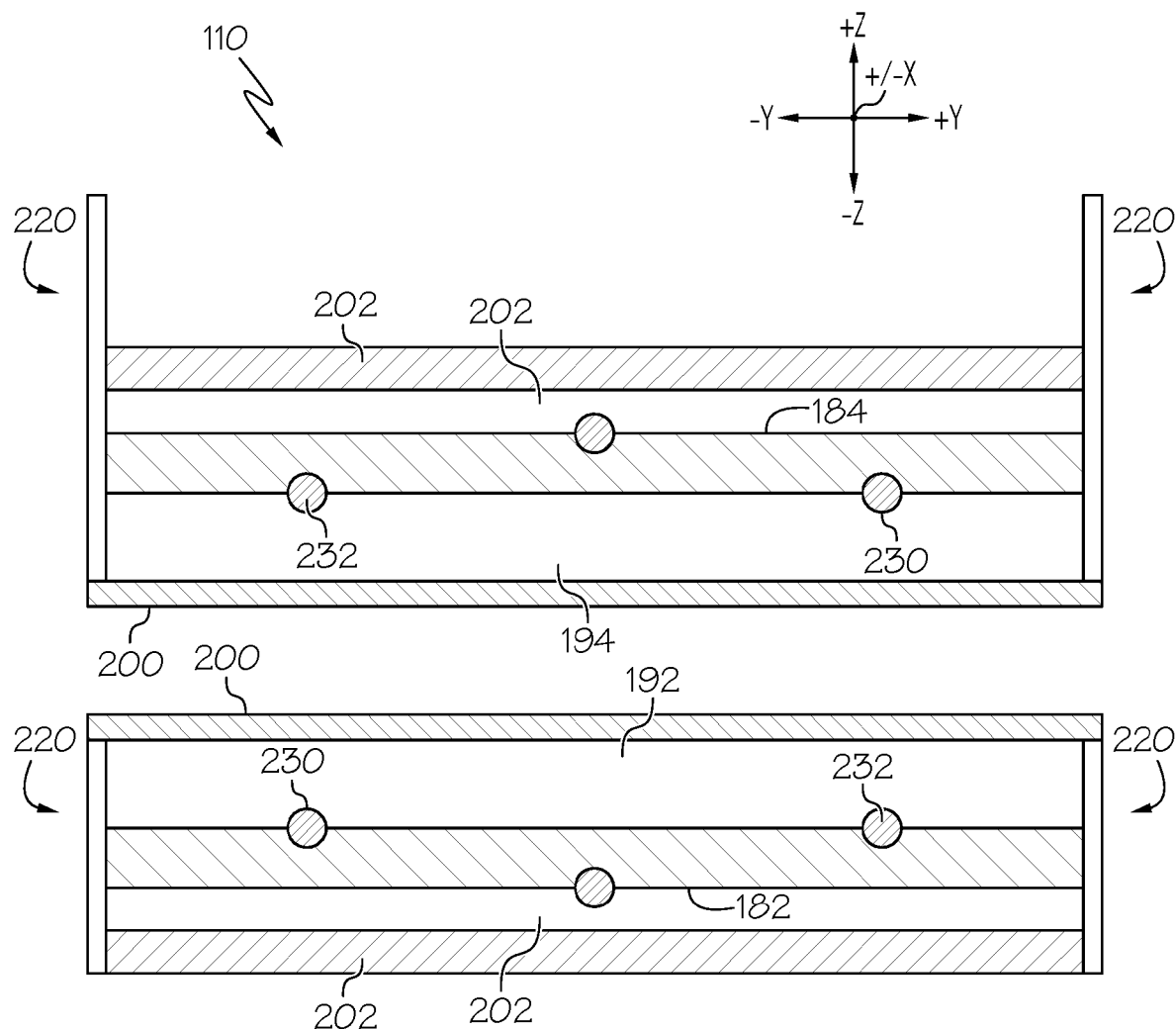
FIG. 7 schematically depicts another vertical cross-section of the molten glass delivery conduit assembly of the module of FIG. 5, according to one or more embodiments shown and described herein.
Figure 8:
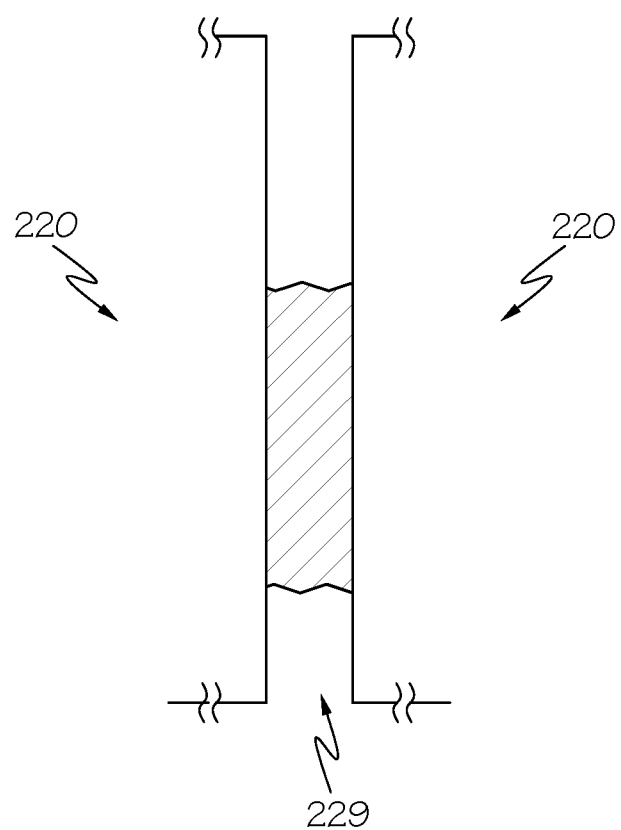
FIG. 8 schematically depicts a glass seal formed between flanges of adjacent modules of a modular molten glass delivery apparatus, according to one or more embodiments shown and described herein.

Referring now to FIGS. 5-7, FIG. 5 schematically depicts a cross-section of the module 102a with the molten glass delivery conduit assembly 110 positioned in the volume enclosed by the support frame 128 and the base plate 124; FIG. 6A schematically depicts a cross-section of the molten glass delivery conduit assembly 110 through the X-Z plane of the coordinate axes depicted in the figures; FIG. 6B schematically depicts an exploded view of a portion of the molten glass delivery conduit assembly 110 of FIG. 6A; FIG. 6C schematically depicts a cross-section of the molten glass delivery conduit assembly 110 through the X-Z plane of the coordinate axes depicted in the figures and comprising a flange 220; and FIG. 7 depicts a cross-section of the molten glass delivery conduit assembly 110 through the Y-Z plane of the coordinate axes depicted in the figures. In embodiments, the molten glass delivery conduit assembly 110 may comprise a cradle assembly 180, a tube assembly 190, and a delivery conduit 200. In embodiments, the molten glass delivery conduit assembly 110 may further comprise at least one flange 220 electrically coupled to the delivery conduit 200. In embodiments, the cradle assembly 180 and the tube assembly 190 may be constructed to prevent the cradle assembly 180 and the tube assembly 190 from sliding relative to one another as the molten glass delivery conduit assembly 110 is heated and cools. However, the delivery conduit 200 is free to slide relative to the cradle assembly 180 and the tube assembly 190 as the molten glass delivery conduit assembly 110 is heated and cools.

Specifically referring to FIGS. 6A and 6B, the molten glass delivery conduit assembly 110 may include a delivery conduit 200 through which molten glass flows. In embodiments, the delivery conduit 200 may be formed from refractory metal such as, for example and without limitation, platinum, molybdenum, palladium, rhodium, iridium, rhenium, tantalum, titanium, tungsten, alloys thereof; and/or combinations thereof; to be able to withstand the high temperatures and corrosive nature of the molten glass flowing there through. While the figures depict the delivery conduit 200 as being circular in cross-section, other cross-sections are contemplated and possible, including, without limitation delivery conduits that are elliptical in cross-section, oblong in cross-section, oval in cross-section, and the like. In embodiments, heater windings 201 may be wrapped around the delivery conduit 200 to facilitate heating the delivery conduit 200 and/or to supplement heating of the delivery conduit 200.

In embodiments, the delivery conduit 200 may be positioned in a tube assembly 190 such that the delivery conduit 200 and the tube assembly both extend in the longitudinal direction of the molten glass delivery conduit assembly 110. The tube assembly 190 may be constructed of refractory ceramic material that insulates the delivery conduit 200, and the molten glass flowing there through, and minimizes temperature variations in the radial direction of the molten glass delivery conduit assembly 110 (i.e., temperature variations in directions perpendicular to the +/−Y direction of the coordinate axes depicted in the figures). The tube assembly 190 may be formed from, for example and without limitation, alumina, zirconia, stabilized zirconia, and/or combinations thereof. In embodiments, the tube assembly 190 may be formed from a plurality of discrete portions that are assembled around the delivery conduit 200. For example, in embodiments, the tube assembly 190 may be constructed from a lower tube portion 192 and an upper tube portion 194, as depicted in FIG. 6B. In embodiments, the lower tube portion 192 and/or the upper tube portion 194 may be constructed from a plurality of discrete segments. For example, as depicted in FIG. 6B, the upper tube portion 194 may be constructed of a plurality of tube segments 196a, 196b, 196c extending in the longitudinal direction of the molten glass delivery conduit assembly 110 and arranged in an arch around at least a portion of the delivery conduit 200. While FIG. 6B depicts the upper tube portion 194 as being constructed from a plurality of tube segments 196a, 196b, 196c, other embodiments are contemplated and possible, such as embodiments where the lower tube portion 192 is constructed from a plurality of tube segments and embodiments where both the lower tube portion 192 and the upper tube portion 194 are constructed from a plurality of tube segments.

In the embodiments described herein, the delivery conduit 200 is not adhered or attached to the tube assembly 190 and, as such, the delivery conduit 200 is free to slide with respect to the tube assembly 190. As a result, when the molten glass delivery conduit assembly 110 is heated and cooled, the delivery conduit 200 is free to thermally expand and contract relative to the tube assembly 190 thereby avoiding the introduction of additional stress into the delivery conduit 200.

Still referring to FIGS. 6A and 6B, the delivery conduit 200 and the tube assembly 190 may be positioned in a cradle assembly 180 such that the delivery conduit 200, the tube assembly 190, and the cradle assembly 180 extend in the longitudinal direction of the molten glass delivery conduit assembly 110. The cradle assembly 180 may be constructed of refractory ceramic material that insulates the tube assembly 190, the delivery conduit 200, and the molten glass flowing there through, and minimizes temperature variations in the radial direction of the molten glass delivery conduit assembly 110. The cradle assembly 180 may be formed from, for example and without limitation, alumina, zirconia, stabilized zirconia, and/or combinations thereof. In embodiments, the cradle assembly 180 may be formed from a plurality of discrete portions that are assembled around the tube assembly 190. For example, in embodiments, the cradle assembly 180 may be constructed from a lower tube portion 192 and an upper tube portion 194, as depicted in FIG. 6B.

Referring now to FIGS. 5 and 6A, insulating refractory block 202 and/or refractory board may be positioned around the cradle assembly 180 to provide further insulation to the delivery conduit 200, the tube assembly 190, the cradle assembly 180, and the molten glass flowing there through. In embodiments, the refractory block 202 may be formed from, for example and without limitation, alumina, zirconia, stabilized zirconia, and/or combinations thereof.

As noted herein, the components and construction of individual modules of the modular molten glass delivery apparatus 100 may generally be the same. However, in embodiments, the refractory ceramic materials use in, for example, the cradle assembly 180 and the tube assembly 190, may be different in each of the modules. Specifically, the refractory ceramic materials may be selected to provide the desired amount of insulation or, conversely, the desired amount of heat conduction, in a particular module of the modular molten glass delivery apparatus 100 regardless of the refractory ceramic materials used in another module of the modular molten glass delivery system.

Referring now to FIG. 7, in embodiments, the cradle assembly 180 and the tube assembly 190 may be joined to prevent relative movement between the cradle assembly 180 and the tube assembly 190 when the molten glass delivery conduit assembly 110 is heated and cooled. This allows the molten glass delivery conduit assembly 110 and the upper carriage to be supported as a single, unitary solid by, for example, the mass compensation member 150. Similarly, in embodiments, the cradle assembly 180 and refractory block 202 are joined to prevent relative movement between the cradle assembly 180 and the refractory block 202 when the molten glass delivery conduit assembly 110 is heated and cooled. For example, in embodiments, one or more keyways 230 may be formed between the lower tube portion 192 and the lower cradle block 182 such that a portion of each keyway 230 is positioned in the lower tube portion 192 and a portion of the keyway 230 is positioned in the lower cradle block 182. The keyways 230 may extend in a lateral direction of the molten glass delivery conduit assembly 110 transverse to the longitudinal direction of the molten glass delivery conduit assembly 110. A key 232 may be positioned in each keyway 230 thereby coupling the lower tube portion 192 and the lower cradle block 182 and preventing relative motion between the lower tube portion 192 and lower cradle block 182 when the molten glass delivery conduit assembly 110 is heated and cools. In embodiments, the keys 232 in each keyway 230 may be formed from refractory material such as, for example and without limitation, refractory ceramic materials and refractory metals. Alternatively, the keys 232 may be formed from a load bearing material such as, for example and without limitation, structural steel. Alternatively or additionally, the upper tube portion 194 and the upper cradle block 184 may be coupled in a similar manner as the lower tube portion 192 and the lower cradle block 182.

Similarly, one or more keyways 230 may be formed between the refractory block 202 and the lower cradle block 182 such that a portion of each keyway 230 is positioned in the refractory block 202 and a portion of the keyway 230 is positioned in the lower cradle block 182. The keyways 230 extend in a lateral direction of the molten glass delivery conduit assembly 110 transverse to the longitudinal direction of the molten glass delivery conduit assembly 110. A key 232 may be positioned in each keyway 230 thereby coupling the refractory block 202 and the lower cradle block 182 and preventing relative motion between the refractory block 202 and lower cradle block 182 when the molten glass delivery conduit assembly 110 is heated and cools. In embodiments, the keys 232 in each keyway 230 may be formed from refractory material such as, for example and without limitation, refractory ceramic materials and refractory metals. Alternatively, the keys 232 may be formed from a load bearing material such as, for example and without limitation, structural steel. Alternatively or additionally, the refractory block 202 and the upper cradle block 184 may be coupled in a similar manner as the refractory block 202 and the lower cradle block 182.

Referring now to FIGS. 2, and 6C-8, in embodiments, each module 102a, 102b of the modular molten glass delivery apparatus 100 may comprise a separate delivery conduit 200. In these embodiments, the molten glass delivery conduit assembly 110 may comprise flanges 220 positioned at both ends of the delivery conduit 200. The flanges 220 facilitate the formation of glass seals between, for example, the molten glass delivery conduit assemblies 110 of individual modules 102a, 102b of the modular molten glass delivery apparatus 100. For example, the modular molten glass delivery apparatus 100 may comprise a plurality of modules arranged in series, as noted herein. Molten glass flows through the modules in a serial fashion (i.e., through one module before flowing through the next module). Conventional seals are not used between adjacent modules 102a, 102b of the modular molten glass delivery apparatus due to the relatively high temperature and corrosive nature of the molten glass, together with the relatively large thermal expansion of components of the modules. Instead, molten glass is allowed to leak between the adjacent modules 102a, 102b. As the molten glass cools and solidifies, a glass seal is formed between the adjacent modules 102a, 102b. In the embodiment depicted in FIG. 8, molten glass leaks between the flanges 220 of adjacent modules 102a, 102b and solidifies between the flanges 220, thereby forming a glass seal 229.

In embodiments, the flanges 220 may be electrically conductive to facilitate heating the delivery conduit 200 by flowing current through the flanges 220 and, in turn, the delivery conduit 200. In these embodiments, the flanges 220 circumscribe the delivery conduit 200 and are maintained in electrical contact with an exterior surface of the delivery conduit 200. Electrical current is passed through the flanges 220 and into the delivery conduit 200 to heat the delivery conduit 200 and the molten glass within the delivery conduit 200. In various embodiments, the flanges 220 circumscribe at least a portion of the delivery conduit 200 and can be positioned at longitudinal ends of the molten glass delivery conduit assembly 110. Because of the electrical resistance of the delivery conduit 200, the electrical current heats the delivery conduit directly, thereby heating the molten glass inside the delivery conduit 200.

Referring specifically to FIG. 6C by way of example, the flanges 220 may comprise a bus portion 222 and a distribution portion 224, where the distribution portion 224 has a uniform cross-sectional width around the delivery conduit 200. However, other embodiments are contemplated and possible.

Figure 9:
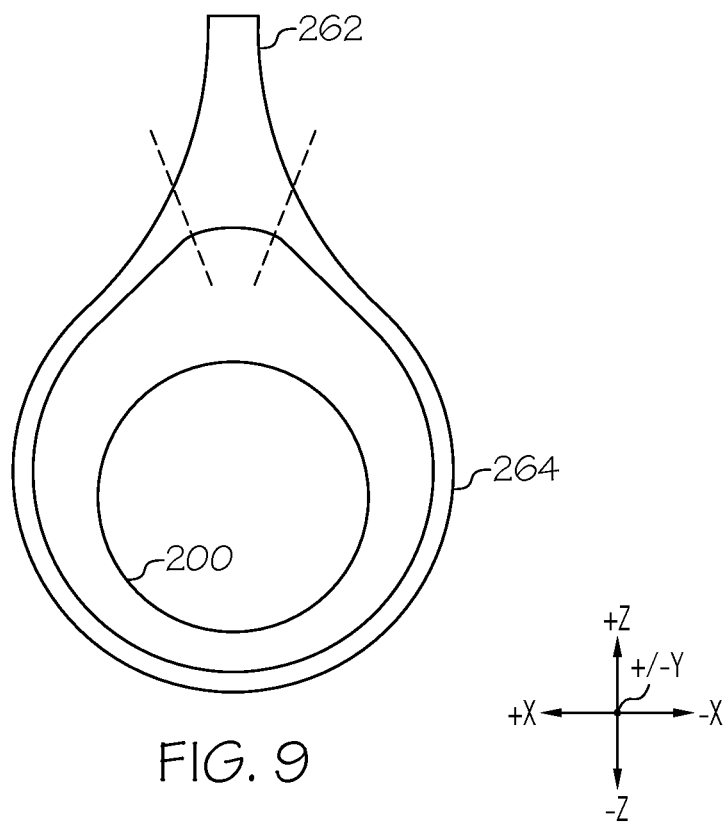
FIG. 9 schematically depicts an embodiment of a flange for heating a delivery conduit, according to one or more embodiments shown and described herein.
Figure 10:
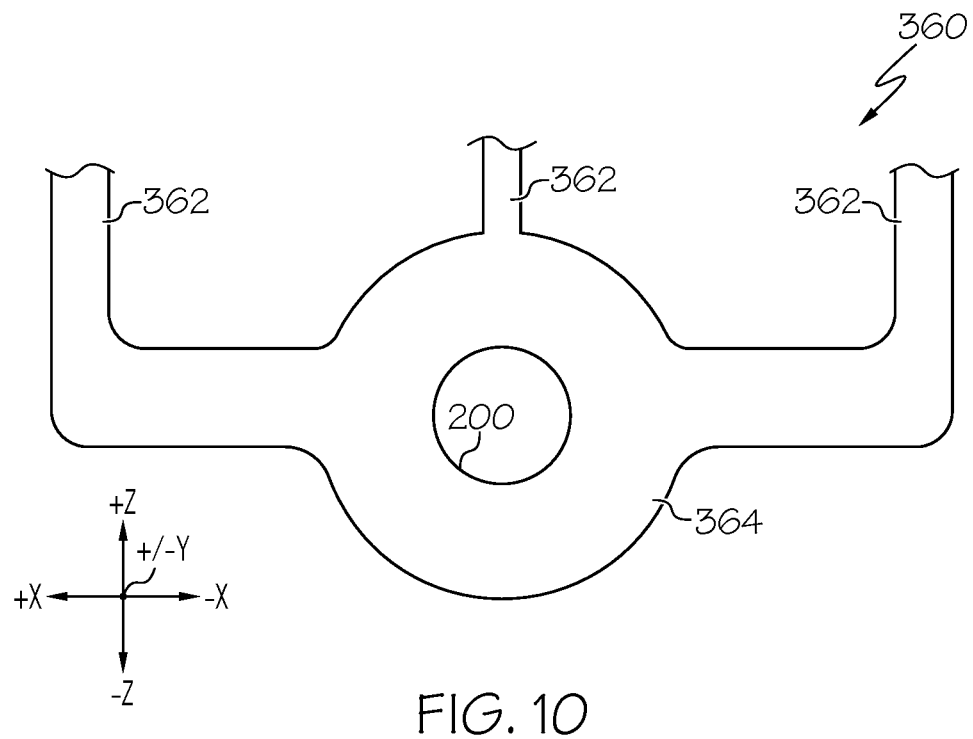
FIG. 10 schematically depicts an embodiment of a flange for heating a delivery conduit, according to one or more embodiments shown and described herein.
Figure 11:
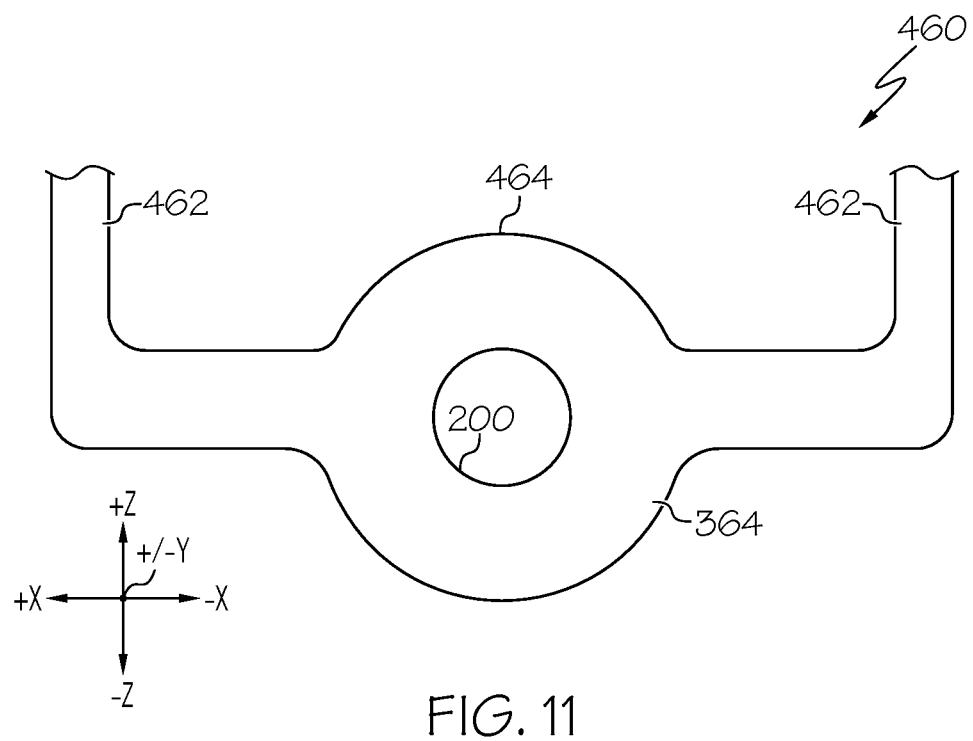
FIG. 11 schematically depicts an embodiment of a flange for heating a delivery conduit, according to one or more embodiments shown and described herein.
Figure 12:
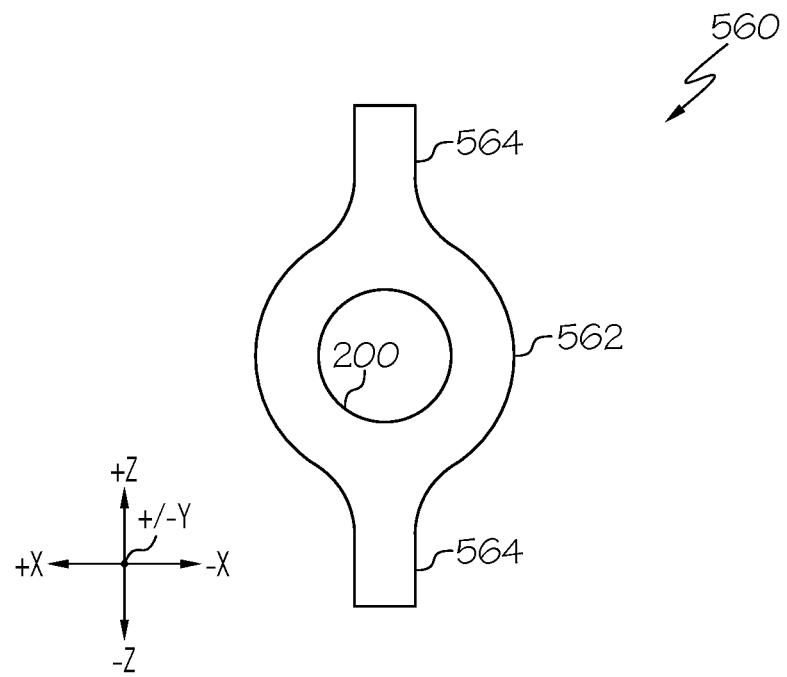
FIG. 12 schematically depicts an embodiment of a flange for heating a delivery conduit, according to one or more embodiments shown and described herein.
Figure 13:
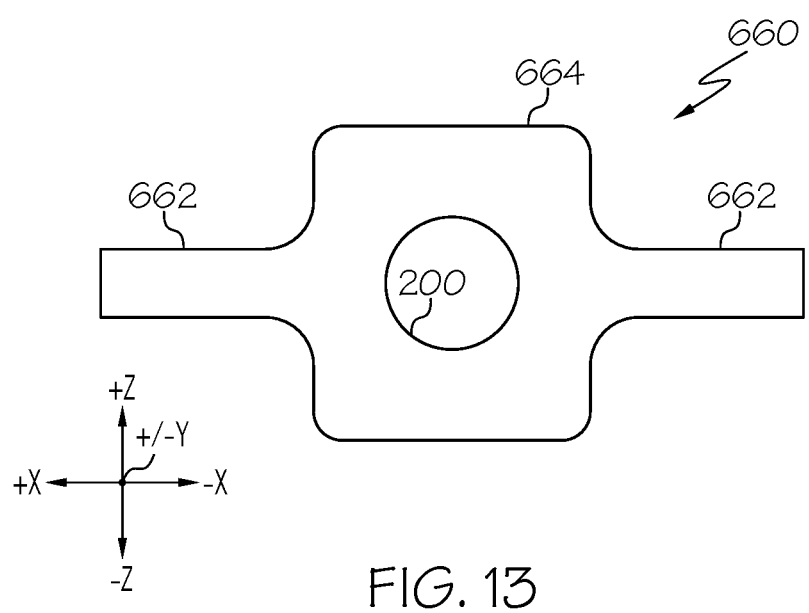
FIG. 13 schematically depicts an embodiment of a flange for heating a delivery conduit, according to one or more embodiments shown and described herein.

In particular, FIGS. 9-13 depict various alternative configurations of flanges for use with the delivery conduit 200. For example FIG. 9, depicts another embodiment of a flange 260 comprising a bus portion 262 and a distribution portion 264, where the distribution portion 264 has a non-uniform cross-sectional width around the delivery conduit 200. FIG. 10 depicts an embodiment of a flange 360 that comprises a plurality of bus portions 362 that extend from the distribution portion 364. FIG. 11 depicts an embodiment of a flange 460 comprising two bus portions 462 that extend from the distribution portion 464 in a lateral direction (i.e., the +/−X direction of the coordinate axes depicted in the figures) and comprise at least a portion that extends in a vertical direction (i.e., the +Z direction of the coordinate axes depicted in the figures) for connection with electrical leads. FIG. 12 depicts an embodiment of a flange 560 comprising two bus portions 562 that extend in opposite directions from the distribution portion 564, for example in opposite vertical directions. FIG. 13 depicts an embodiment of a flange 660 comprising two bus portions 662 that extend laterally in opposite directions from the distribution portion 664 for connection with electrical leads. The various configurations of the flanges 220, 260, 360, 460, 560, 660 may facilitate the introduction of electrical current into the delivery conduit 200 for targeted and/or high efficiency heating of the molten glass, and may be selected based on at least the magnitude of the electrical current that is being passed to the delivery conduit 200 and accessibility of the bus portions for connection with a current source.

In the embodiments described herein, the flanges 220, 260, 360, 460, 560, 660 may be made from a low resistance metal, for example, a transition metal such as, without limitation, electrical grade nickel 600/601 and/or a high temperature refractory metal such as, for example and without limitation, platinum or alloys thereof, that are suitable for use at the elevated temperatures experienced in glass manufacturing. In various embodiments, the flanges 220, 260, 360, 460, 560, 660 may be cooled, for example, by air-cooling or water-cooling. In various embodiments, cooling fluid can be directed through a cooling tube (not depicted) coupled to and extending around the flanges 220, 260, 360, 460, 560, 660. In other embodiments, cooling fluid can be used to cool selected portions of the flanges 220, 260, 360, 460, 560, 660.

While FIGS. 2, and 6C-8 depict each module 102a, 102b of the modular molten glass delivery apparatus 100 as comprising a separate delivery conduit 200, other embodiments are contemplated and possible. For example, in other embodiments (not depicted), the modular molten glass delivery apparatus 100 may comprise a single delivery conduit 200 that extends through and between a plurality of modules 102a, 102b. In these embodiments, the flanges 220, 260, 360, 460, 560, 660 may be located at opposite ends of the single delivery conduit 200. In some embodiments, the single delivery conduit 200 may further include additional flanges positioned on the conduit between adjacent modules.

Figure 14:
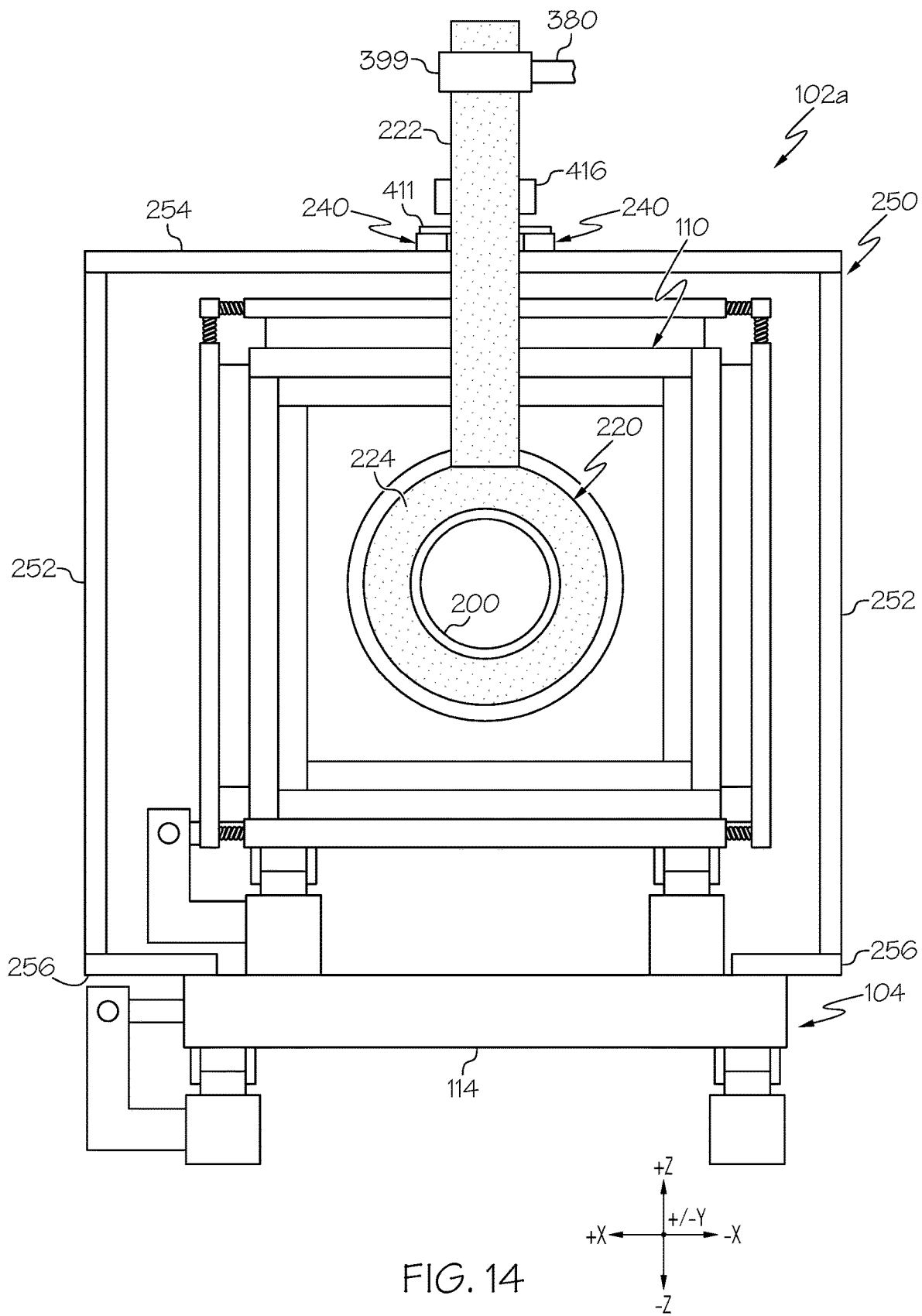
FIG. 14 schematically depicts an embodiment of a module of modular molten glass delivery apparatus comprising an exterior support frame, according to one or more embodiments shown and described herein.
Figure 15:
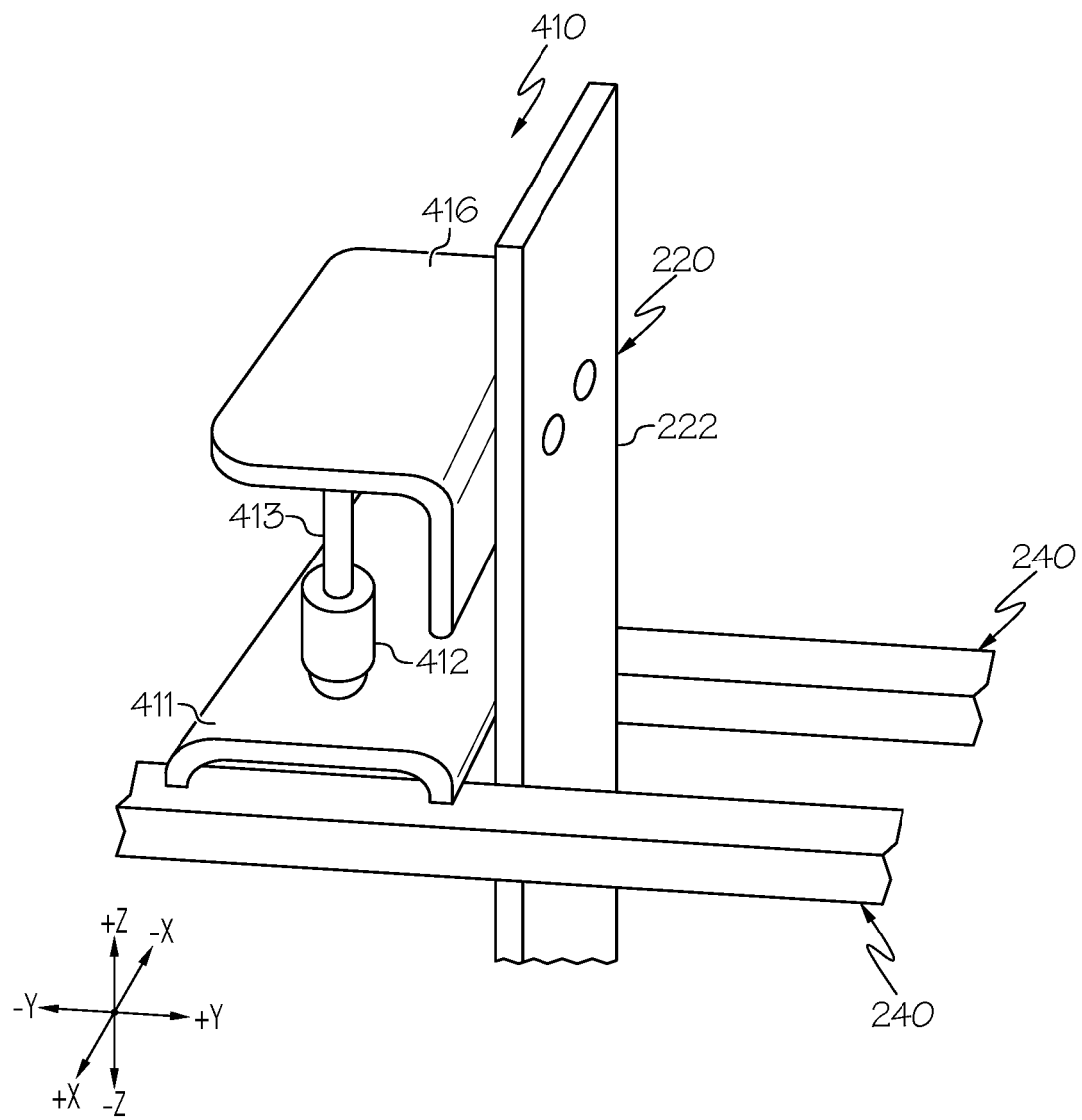
FIG. 15 schematically depicts a translatable support for supporting a flange for a delivery conduit, according to one or more embodiments shown and described herein.

Referring now to FIGS. 14 and 15, in embodiments, the module 102a may further comprise an exterior support frame 250. The exterior support frame 250 may comprise exterior vertical support members 252 joined to exterior horizontal support members 254 (one depicted in FIG. 14) by welding, mechanical fasteners, or the like. The exterior support frame 250 may be coupled to the lower carriage frame 114 of the lower carriage 104 with, for example and without limitation, brackets 256 such that the exterior support frame 250 is translatable with the lower carriage 104. In embodiments, the flanges 220 are coupled to the exterior support frame 250 to accommodate translation of the flanges 220 upon thermal expansion and contraction of the flanges and other components of the molten glass delivery conduit assembly 110. For example, the exterior support frame 250 may comprise flange support members 240 coupled to the exterior horizontal support members 254 of the exterior support frame 250. The flanges 220 may be coupled to the flange support members 240 through a translatable support 410. The translatable support 410 may include a support plate 411 coupled to the flange support members 240 and a coupling bracket 416 that translates in the vertical direction 84 relative to the support plate 411. The coupling bracket 416 may be affixed to the distribution portion 224 of the flange 220. The translatable support 410 may include a spring 412 that applies an upward force to the coupling bracket 416 through transfer rod 413 in contact with the coupling bracket 416. Electrical insulation (not depicted) may be positioned between the transfer rod 413 and the coupling bracket 416 such that the coupling bracket 416 and the support plate 411 are electrically isolated from one another. The spring 412 forces the coupling bracket 416 of the translatable support 410 into contact with the bus portion 222 of the flange 220 through the transfer rod 413. The force applied by the spring 412 counteracts the load (and related stress) that would otherwise be imparted to the delivery conduit 200 by the weight of the flange 220. The spring 412 may also accommodate the thermal expansion and contraction of the flange 220 and other components of the molten glass delivery conduit assembly 110.

For example, as the delivery conduit 200 is heated or cools, the delivery conduit 200 thermally expands or contracts. Thermal expansion and contraction of the delivery conduit changes the elevation of the flange 220. The spring 412 maintains support of the flange 220 during expansion and contraction while minimizing stress imparted to the delivery conduit by the weight of the flange 220. Longitudinal expansion and contraction of the delivery conduit 200 also changes the location of the flange 220 in the longitudinal direction (i.e., the +/−Y directions of the coordinate axes depicted in the figures). The translatable support 410 is repositionable to accommodate changes in the longitudinal position of the flange 220. For example, the spring 412 may slide along the support plate 411 in the longitudinal direction.

While not depicted in the figures, in embodiments, the exterior support frame 250 may further comprise panels attached the exterior support frame 250 thereby forming a capsule around the molten glass delivery conduit assembly 110. Encapsulation of the molten glass delivery conduit assembly 110 allows for the atmosphere immediately surrounding the molten glass delivery conduit assembly 110 to be controlled, thereby preventing, for example, hydrogen permeation through platinum components of the molten glass delivery conduit assembly 110.

Figure 16:
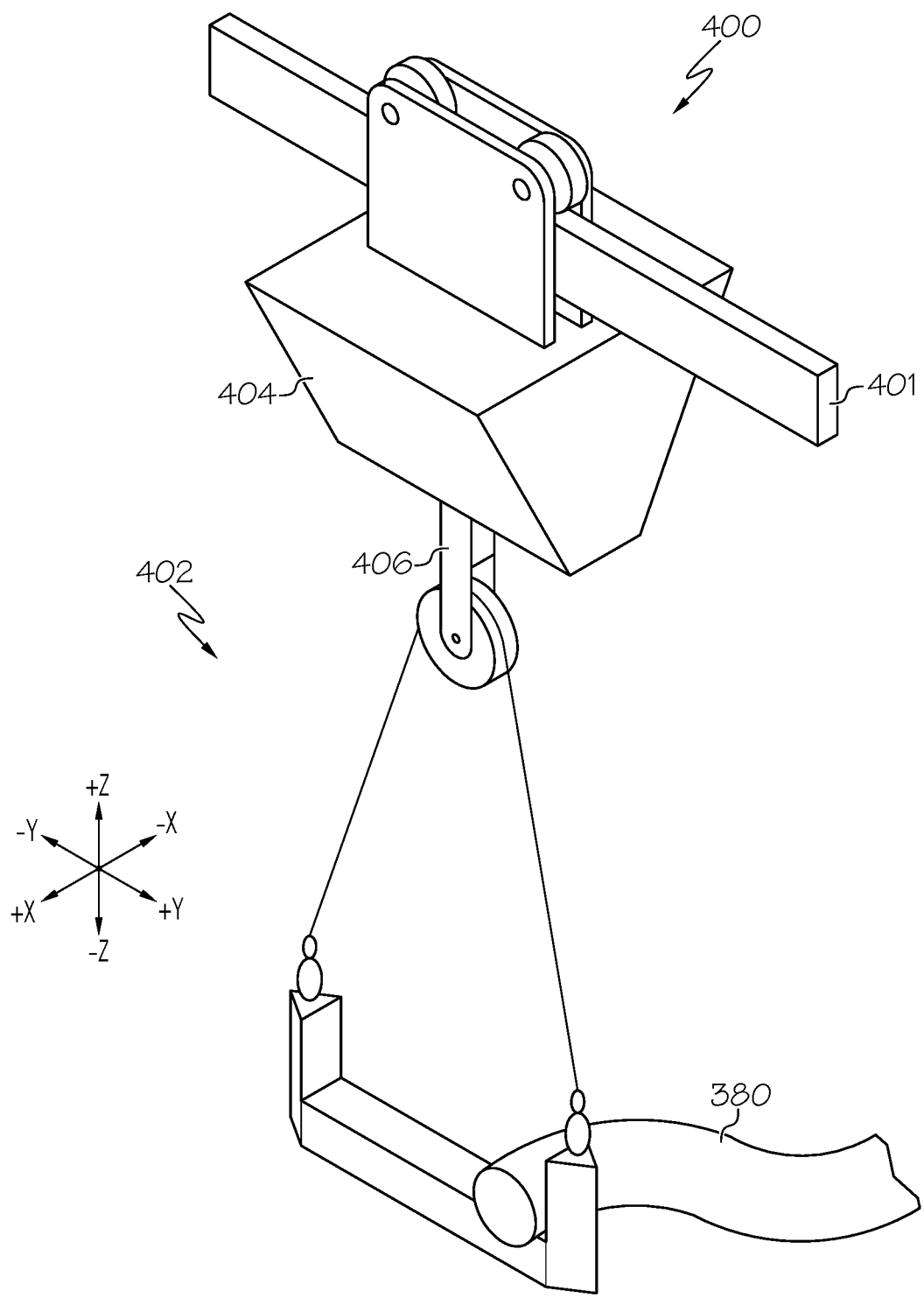
FIG. 16 schematically depicts an overhead support structure for supporting delivery cables coupled to a flange, according to one or more embodiments shown and described herein.

Referring now to FIGS. 14 and 16, in embodiments, the bus portions 222 of the flanges 220 may be coupled to a power source (not depicted) with clamps 399 and power delivery cables 380. The delivery cables 380 may have a relatively large mass to accommodate delivery of the electrical power required for heating the delivery conduit 200 without melting the delivery cables 380. A portion of the weight of the distribution cables may be transmitted to the delivery conduit 200 through the flanges 220, thereby introducing additional stress to the delivery conduit 200. In embodiments, to offset the weight of the delivery cables 380 imparted to the delivery conduit (and thereby reduce the stress imparted to the delivery conduit 200), the delivery cables may be supported by an overhead support structure 400 as depicted in FIG. 16. The overhead support structure 400 may include a rail 401 suspend over the module 102a. The overhead support structure 400 may further include hangers 402 that extend from the rail 401. The hangers 402 may be coupled to the delivery cables 380 such that the delivery cables 380 are suspended from the rail 401. The hangers 402 support the weight of the delivery cables 380, such that stress imparted on the delivery conduit 200 by the weight of the delivery cables 380 is minimized. In embodiments, the hangers 402 may be supported by trolleys 404 that are translatable along the rail 401. The trolleys 404 may allow the hangers 402 to translate while supporting the delivery cables 380 thereby minimizing misalignment of the delivery cables 380 with the flanges 220 to which the delivery cables 380 are coupled as the delivery conduit 200 expands and contracts. For example, as the module 102a is heated and cools, the delivery conduit 200 expands and contracts, which may cause the flanges 220 to translate in the longitudinal direction. The trolleys 404 may allow the delivery cables 380 to translate with the flanges 220 such that the hangers 402 support the delivery cables 380 as the position of the flanges 220 change, thereby reducing the stress imparted to the delivery conduit 200 by the delivery cables 380.

In embodiments, the hangers 402 may include spring supports 406. The spring supports 406 may have a spring constant that allows the spring support 406 to provide continuous vertical support to the delivery cables 380 when the delivery cables 380 are displaced vertically (i.e., in the +/−Z direction of the coordinate axes depicted in the figures). For example, when the delivery conduit 200 is heated and cools, the delivery conduit 200 thermally expands both radially (i.e., in directions perpendicular to the +/−Y directions of the coordinate axes depicted in the figures) and longitudinally (i.e., in the +/−Y directions of the coordinate axes depicted in the figures). Radial expansion and contraction of the delivery conduit 200 changes the vertical elevation of the flange 220. To minimize the stress imparted onto the delivery conduit 200 by the weight of the conductor flanges 160, the spring supports 406 may be selected and fitted such that a vertical force is applied to the conductor flanges 160, even when the positions of the conductor flanges 160 are shifted vertically. The spring supports 406, therefore, support the delivery cables 380 irrespective of the position of the delivery cables 380 relative to the overhead support structure 400. The hangers 402, therefore, may minimize the introduction of stress to components of the module 102a, for example, the delivery conduit 200, as the module 102a is heated and cools.

Operation of the modular molten glass delivery apparatus 100 with the glass manufacturing apparatus 10 will now be described in further detail with specific reference to FIGS. 1-5. Reference will be made to use of the modular molten glass delivery apparatus 100 in place of connecting tube 50 connecting the melter 11 with the fining system 13.

Initially, the modules 102a, 102b may be positioned between the melter 11 and the fining system 13 on the lower rail system 112. The delivery conduits 200 of each module 102a, 102b may be aligned with one another, with the outlet of the melter 11, and the inlet of the fining system 13 to facilitate the flow of molten glass 16 from the melter 11 to the fining system 13 through the modules 102a, 102b of the modular molten glass delivery apparatus 100. Current may then introduced into the flanges 220 (and/or into the heater windings 201 (FIG. 6B) to pre-heat the delivery conduits 200 prior to the delivery conduits 200 receiving a flow of molten glass 16 from the melter 11.

Thereafter, molten glass 16 may be directed through the delivery conduits 200 of the modules 102a, 102b and into the fining system 13 while the delivery conduits 200 are heated through the flanges 220 and/or the heater windings 201. As the temperatures of the modules 102a, 102b increase, components of the modules 102a, 102b may thermally expand radially and longitudinally due to their respective coefficients of thermal expansion, as described herein. For example, as the delivery conduits 200 expand longitudinally, the modules 102a, 102b may exert a force against one another and/or against the melter 11 and the fining system 13. These forces may cause the displacement of the lower carriages 104 along the lower rail systems 112 and the upper carriages 108 along the upper rail systems 106 of the modules 102a, 102b, thereby accommodating the longitudinal thermal expansion of the modules 102a, 102b of the modular molten glass delivery apparatus 100 in the longitudinal direction without introducing static stresses into the component parts of the modules 102a, 102b, such as the delivery conduits 200 or the like. Displacement of the lower carriages 104 may be assisted by, for example, the expansion assist members 144 and the mass compensation members 150, as described herein.

The radial thermal expansion of components of the modules 102a, 102b may be accommodated by the lateral spring elements 134 and the vertical spring elements 136 of the support frames 128. Specifically, as the components of the molten glass delivery conduit assemblies 110 thermally expand radially and press against the vertical support members 130a, 130b, 130c and the horizontal support members 132a, 132b, the lateral spring elements 134 and the vertical spring elements 136 allow for displacement of the vertical support members 130a, 130b, 130c and horizontal support members 132a, 132b, respectively, thereby accommodating the radial thermal expansion of the molten glass delivery conduit assemblies 110 and mitigating the introduction of stress in the delivery conduits 200.

Referring to FIGS. 2 and 14-16, the overhead support structures 400 and the translatable supports 410 of the modules 102a, 102b accommodate displacement of the flanges 220 of the modules 102a, 102b as the modular molten glass delivery apparatus 100 is heated. Specifically, the springs 412 of the translatable supports 410 accommodate displacement of the flanges 220 in the vertical direction by expanding between the support plates 411 and the coupling brackets 416 while also sliding along the support plates 411 to accommodate longitudinal displacement of the flanges 220, thereby mitigating the introduction of stress to the delivery conduits 200 through the flanges 220. Simultaneously, the spring supports 406 accommodate vertical displacement of the flanges 220 and attached delivery cables 380 by retracting in the upwards vertical direction, reducing the weight of the delivery cables 380 incident on the delivery conduits 200 through the flanges 220 and mitigating the introduction of stress into the delivery conduits 200.

Referring again to FIGS. 1-3, as the temperature of the modules 102a, 102b of the modular molten glass delivery apparatus 100 equilibrates and thermal expansion of the components of the glass manufacturing apparatus 10 is reduced, such as ceases, the carriage couplers 170 are used to couple the lower carriages 104 of the modules 102a, 102b together, thereby preventing relative motion between the modules 102a, 102b.

The modular molten glass delivery apparatuses described herein may be used to reduce or mitigate stress in components of the modular molten glass delivery apparatuses, thereby prolonging the service life of the modular molten glass delivery apparatuses, increasing production yields, and reducing operating and maintenance costs of the glass manufacturing apparatuses. For example, the modular molten glass delivery apparatuses described can reduce stresses caused by thermal expansion of components of the apparatuses by accommodating for the thermal expansion of components of the apparatuses. By accommodating for thermal expansion of the components, higher operating temperatures may be achieved, which, in turn, allows for greater flow rates of molten glass (i.e., an increase in the mass of molten glass per hour) through the apparatuses, thereby increasing production output while simultaneously reducing the risk of damage or failure due to stress.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A glass manufacturing apparatus comprising:
a molten glass delivery apparatus, the molten glass delivery apparatus comprising at least one module comprising:
a lower carriage comprising a plurality of lower carriage rollers;
an upper rail system supported on the lower carriage, the upper rail system comprising a pair of upper support rails oriented at an elevation angle $\alpha$ greater than 0 degrees relative to horizontal; and
an upper carriage comprising:
a base plate oriented at an elevation angle $\beta$ greater than 0 degrees relative to horizontal; and
a plurality of upper carriage rollers coupled to the base plate and engaged with the pair of upper support rails of the upper rail system.

2. The glass manufacturing apparatus of claim 1, wherein the elevation angle $\alpha$ is equal to the elevation angle $\beta$.

3. The glass manufacturing apparatus of claim 1, further comprising a lower rail system comprising a pair of lower support rails, the plurality of lower carriage rollers of the lower carriage engaged with the pair of lower support rails.

4. The glass manufacturing apparatus of claim 1, further comprising an expansion assist member coupled to the lower carriage, the expansion assist member configured to apply an expansion assist force to the lower carriage, wherein the expansion assist member comprises at least one of a pneumatic cylinder, a hydraulic cylinder, or a compression spring.

5. The glass manufacturing apparatus of claim 1, further comprising a mass compensation member coupled to the upper carriage and the upper rail system, the mass compensation member configured to apply an upward mass compensating force to the upper carriage along the upper rail system, wherein the mass compensation member comprises at least one of a pneumatic cylinder, a hydraulic cylinder, or a compression spring.

6. The glass manufacturing apparatus of claim 5, further comprising an expansion assist member coupled to the lower carriage, the expansion assist member configured to apply an expansion assist force to the lower carriage, wherein the expansion assist member comprises at least one of a pneumatic cylinder, a hydraulic cylinder, or a compression spring.

7. The glass manufacturing apparatus of claim 6, wherein a horizontal component of the upward mass compensating force is opposite a horizontal component of the expansion assist force.

8. The glass manufacturing apparatus of claim 1, further comprising a support frame coupled to the base plate of the upper carriage, the support frame comprising:
vertical support members coupled to the base plate with lateral spring elements such that the vertical support members are displaceable in a lateral direction relative to the base plate; and
horizontal support members coupled to the vertical support members with vertical spring elements and lateral spring elements such that the horizontal support members are displaceable in a vertical direction relative to the vertical support members and the vertical support members are displaceable in the lateral direction relative to the horizontal support members.

9. The glass manufacturing apparatus of claim 8, wherein the support frame comprises:
vertical support plates coupled to the vertical support members; and
a horizontal support plate coupled to the horizontal support members.

10. The glass manufacturing apparatus of claim 1, further comprising a molten glass delivery conduit assembly supported on the upper carriage, the molten glass delivery conduit assembly comprising:
  a cradle assembly comprising an upper cradle block formed from refractory ceramic material and a lower cradle block formed from refractory ceramic material;
  a tube assembly positioned in the cradle assembly and extending in a longitudinal direction of the molten glass delivery conduit assembly, the tube assembly comprising an upper tube portion formed from refractory ceramic material and a lower tube portion formed from refractory ceramic material; and
  a delivery conduit positioned in the tube assembly and extending in the longitudinal direction, the delivery conduit formed from refractory metal.

11. The glass manufacturing apparatus of claim 10, further comprising:
  a keyway formed between the lower tube portion and the lower cradle block, the keyway extending in a lateral direction transverse to the longitudinal direction; and
  a key coupling the lower tube portion and the lower cradle block positioned in the keyway.

12. The glass manufacturing apparatus of claim 10, wherein the molten glass delivery conduit assembly further comprises a refractory block positioned around the cradle assembly, the refractory block formed from refractory ceramic material.

13. The glass manufacturing apparatus of claim 12, further comprising:
  a keyway formed between the lower cradle block and the refractory block, the keyway extending in a lateral direction transverse to the longitudinal direction; and
  a key coupling the lower cradle block and the refractory block positioned in the keyway.

14. The glass manufacturing apparatus of claim 10, wherein the upper tube portion comprises a plurality of tube segments extending in the longitudinal direction and arranged in an arch around a portion of the delivery conduit.

15. The glass manufacturing apparatus of claim 10, further comprising at least one flange coupled to the delivery conduit at a longitudinal end of the delivery conduit.

16. The glass manufacturing apparatus of claim 15, wherein the at least one flange comprises a bus portion coupled to a delivery cable and a distribution portion in contact with the delivery conduit.

17. The glass manufacturing apparatus of claim 16, further comprising a translatable support coupled to the bus portion and a spring element configured to apply a force to the bus portion in a vertical direction.

18. The glass manufacturing apparatus of claim 17, wherein the translatable support is electrically isolated from the bus portion of the at least one flange.

19. The glass manufacturing apparatus of claim 1, further comprising:
  a molten glass delivery conduit assembly comprising:
    a cradle assembly comprising an upper cradle block and a lower cradle block;
    a tube assembly positioned in the cradle assembly and extending in a longitudinal direction of the molten glass delivery conduit assembly, the tube assembly comprising an upper tube portion and a lower tube portion;
    a first keyway formed between the lower tube portion and the lower cradle block, the first keyway extending in a lateral direction transverse to the longitudinal direction; and
    a first key coupling the lower tube portion and the lower cradle block positioned in the first keyway.

20. The glass manufacturing apparatus of claim 19, further comprising a refractory block positioned around the cradle assembly.

21. The glass manufacturing apparatus of claim 20, further comprising:
  a second keyway formed between the lower cradle block and the refractory block, the second keyway extending in a lateral direction transverse to the longitudinal direction of the molten glass delivery conduit assembly, and
  a second key coupling the lower cradle block and the refractory block positioned in the second keyway.

22. The glass manufacturing apparatus of claim 19, wherein the upper tube portion comprises a plurality of tube segments extending in the longitudinal direction and arranged in an arch.

23. The glass manufacturing apparatus of claim 19, further comprising a delivery conduit positioned in the tube assembly and extending in the longitudinal direction.

24. The glass manufacturing apparatus of claim 23, further comprising a flange coupled to the delivery conduit at a longitudinal end of the delivery conduit.

* * * * *